United States Patent [19]

Rice, Jr. et al.

[11] 4,068,208

[45] Jan. 10, 1978

[54] MARINE STREAMER POSITION DETERMINATION SYSTEM

[75] Inventors: Joseph A. Rice, Jr., McKinney; Larry W. Moore, Plano; Robert C. Donald, Richardson, all of Tex.

[73] Assignee: Texas Instruments Incorporated, Dallas, Tex.

[21] Appl. No.: 595,937

[22] Filed: July 14, 1975

[51] Int. Cl.$^2$ ............................................. G01V 1/38
[52] U.S. Cl. .................................. 340/7 R; 340/3 T; 114/244; 114/246
[58] Field of Search ............... 340/3 PS, 3 T, 7 R; 114/237, 244, 246; 73/143; 115/6–8

[56] References Cited

U.S. PATENT DOCUMENTS

| | | | |
|---|---|---|---|
| 3,086,490 | 4/1963 | Nichols | 114/244 |
| 3,525,072 | 8/1970 | Born et al. | 340/7 PC |
| 3,731,264 | 5/1973 | Campbell | 340/3 PS |
| 3,810,081 | 5/1974 | Rininger | 340/3 T |
| 3,840,845 | 10/1974 | Brown | 340/7 R |
| 3,916,813 | 11/1975 | Stahl | 115/6 |

OTHER PUBLICATIONS

Bedenbender, "Three Dimensional Boundry Value . . .", pp. 541–556, Offshore Techn. Conf., p. 1281.
Kiebuzinski, "Ocean Bottom Mapping and Navigation . . .", pp. 109–127, Proc. of 2nd Symp. on Marine Geodesy, SO171.
Reinhartsen, "The GeoNav System", 11/69, pp. 69–87, Proc. of 2nd Symp. on Marine Geodesy, SO171.

*Primary Examiner*—Nelson Moskowitz
*Attorney, Agent, or Firm*—Rene' E. Grossman

[57] ABSTRACT

In marine seismic exploration, it is common for a vessel to tow a streamer, which includes a plurality of pressure sensitive detectors or hydrophones, for the purpose of acquiring seismic signals representative of the underlying structure of the earth. To aid in the interpretation of these seismic signals, it is necessary to know the precise location of the streamer at the time the signals are acquired. Disclosed herein is a method and system for providing a model representative of the location of the streamer relative to the location of the vessel. In one aspect, the system includes an apparatus mounted at the stern of the vessel and coupled to the near end of the streamer. This apparatus is adapted to provide measurements of the yaw and pitch of that portion of the streamer adjacent the vessel. These measurements are employed in the generation of the position model.

7 Claims, 17 Drawing Figures

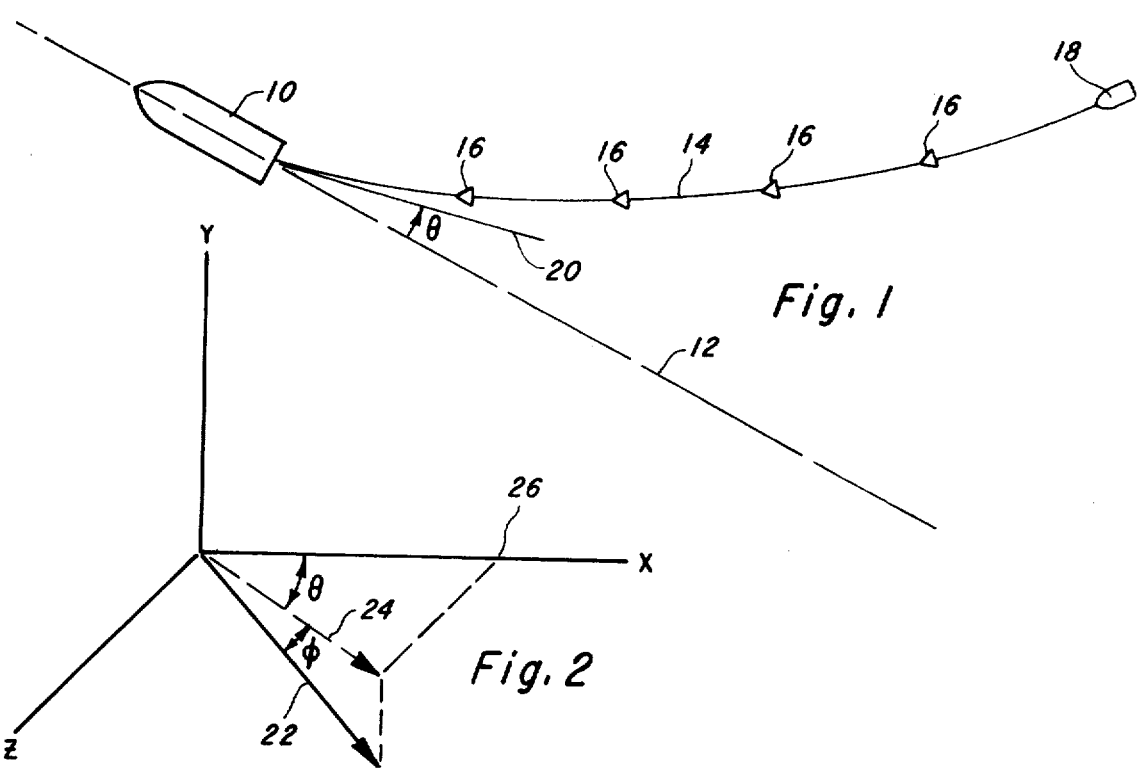
Fig. 1
Fig. 2
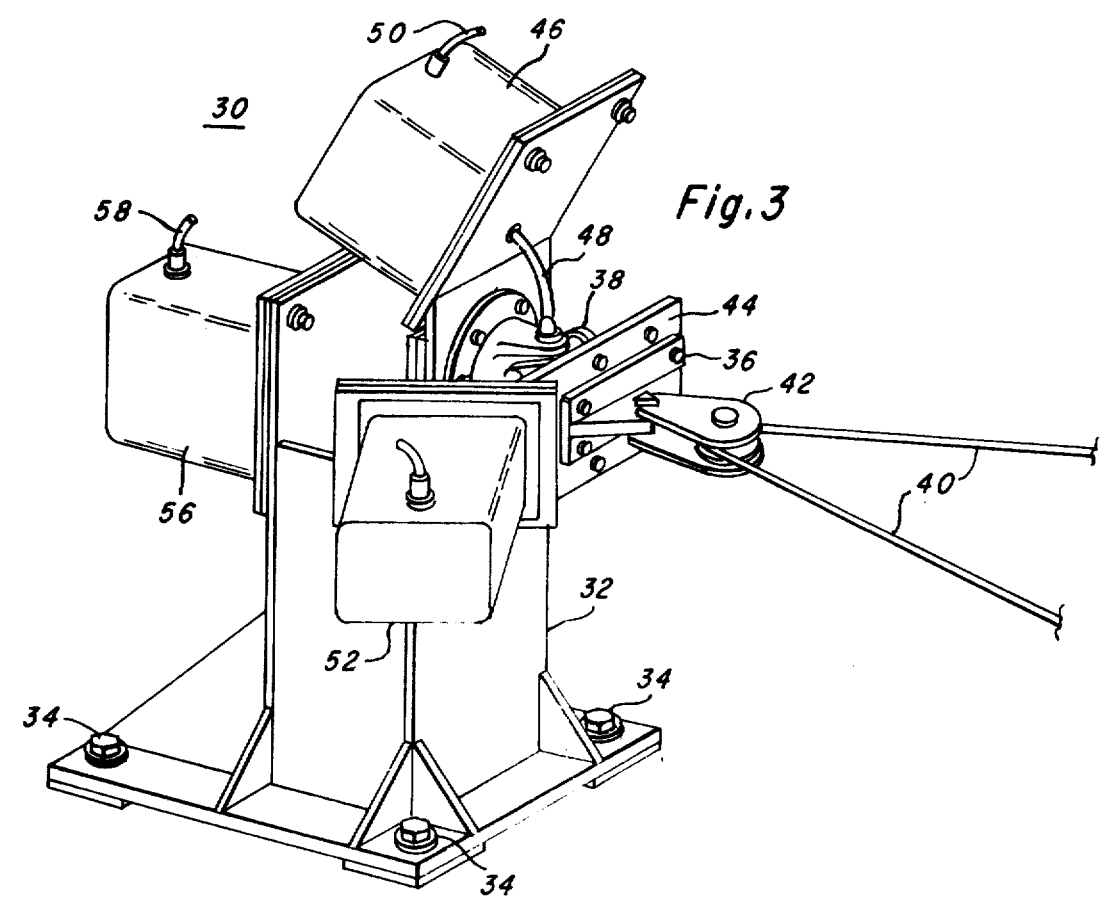
Fig. 3

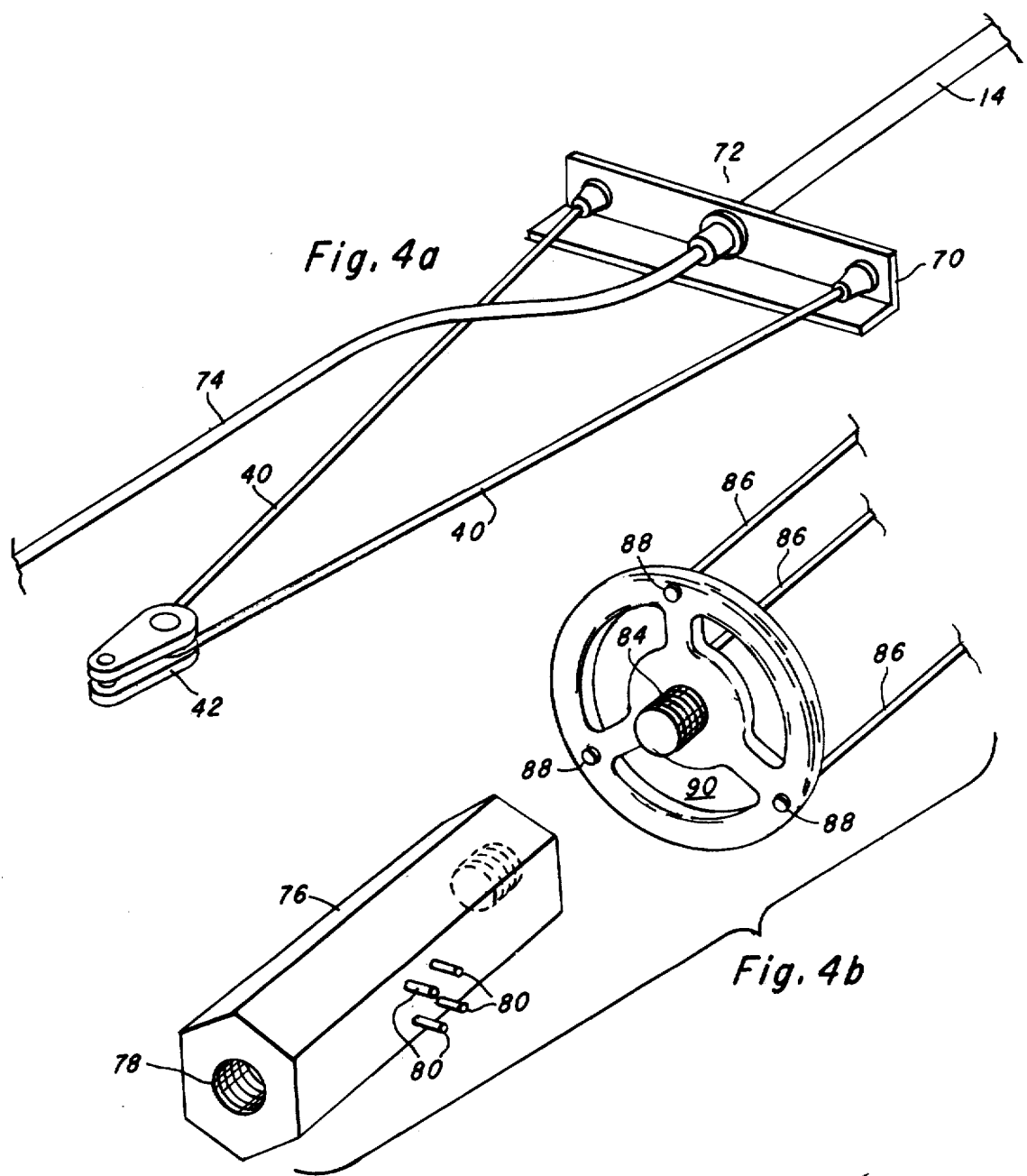
*Fig. 4a*
*Fig. 4b*
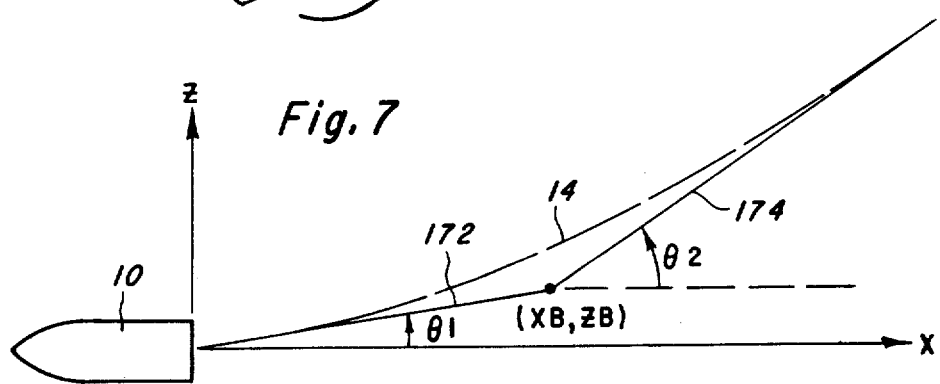
*Fig. 7*

MARINE STREAMER POSITION DETERMINATION SYSTEM

The present invention relates to marine seismic exploration, and in particular to a method and system for determining the position of a towed marine seismic streamer.

In marine seismic exploration, an exploration vessel tows a seismic streamer which houses a plurality of pressure sensitive detectors commonly referred to as hydrophones. Impulsive sources such as explosives or air guns, which may also be towed by the exploration vessel, are fired so as to impart propagating energy to the body of water, and ultimately to the underlying crustal material of the earth. As this energy propagates in a generally downward direction, portions of the energy are reflected by subsurface discontinuities and ultimately detected as pressure variations by the hydrophones. The corresponding electrical signals are coupled by the streamer to recording apparatus aboard the exploration vessel for subsequent use in interpretation of the subsurface crustal structure. For such interpretations to be meaningful, however, it is necessary to know with some precision the location of the exploration vessel at the time the data are required. A number of sophisticated navigational systems have been developed for providing this information. One such system, for example, is the GEONAV* seismic marine navigation and location system manufactured by Texas Instruments Incorporated of Dallas, Texas.

*Trademark of Texas Instruments Incorporated

While such systems are capable of providing reliable measurements of the location of the exploration vessel, there still remain ambiguities in knowledge of the position of the remote parts of the streamer relative to the track followed by the vessel. It is rare, for example, that the streamer trails directly along track. While the streamer is attached to the vessel at a point above the water surface, the majority of the streamer, which may be a mile or greater in length, is typically maintained at a nominal depth below the surface of the water by a plurality of depth controllers located along the length of the streamer. One such depth controller, for example, is the subject of U.S. Pat. No. 3,372,666 to Buford M. Baker, and assigned to the assignee of the present application. One reason for failure of the streamer to trail along the track of the vessel is the fact that the cross-track current velocity at the depth of the streamer often differs from the cross-track current velocity operating on the hull of the vessel itself. Other factors contributing to this problem are boat crab angle and along track current gradients.

Previously, estimates of the streamer position have been made using a radar reflector or transponder located on a surfaced tail buoy which is attached to the end of the streamer remote from the exploration vessel. This permits estimation of the location of the remote end of the streamer, but with inaccuracies which are too great to be compatible with the resolution provided by modern interpretive techniques available for the seismic data itself. Moreover, the radar location technique assumes a straight line path for the streamer between the stern of the vessel and the tail buoy.

It is, therefore, an object of the present invention to provide an improved method and system for the determination of the location of a towed marine seismic streamer.

It is another object to provide a seismic streamer position determining method and system which employs measurements which are conveniently made on the seismic streamer.

It is a further object of the invention to provide a method and system for determining the position of a marine seismic streamer wherein the complexity of the method and system is related to the accuracy of the results desired.

It is yet another object of the invention to provide apparatus for determining the orientation of that portion of the seismic streamer adjacent to the towing vessel.

In a paper entitled "Three-dimensional Boundary Value Problems for Flexible Cables", John W. Bedenbender, Second Annual Off-Shore Technology Conference, Houston, Texas, April 22-24, 1970, Paper No. OTC1281, there is developed a mathematical model for the equilibrium configuration of a marine seismic cable, in the form of six differential equations. The paper further presents a technique for solving the set of differential equations. This technique, however, requires knowledge of a large number of parameters, some of which are poorly known, if at all, in a towed seismic streamer situation. However, using the methods presented in the paper for the study of simulated cases, we have observed that the lateral displacement of the streamer is closely dependent upon the yaw angle of the cable in an earth-relative coordinate system (measured in the horizontal plane), relative to the track traversed by the vessel.

Accordingly, in one aspect of the invention, there is employed a unique apparatus for coupling the marine seismic streamer to the exploration vessel. The body of the apparatus may be attached fixedly at the stern of the vessel. The marine seismic streamer is coupled to the body of the apparatus by a universal joint. In the preferred embodiment, the apparatus includes two synchro units, which cooperate with the universal joint to provide signals representative of the yaw and pitch of the portion of the seismic streamer adjacent the vessel. These measurements of yaw and pitch are given in a ship-relative coordinate system. The apparatus further includes pendulum units, which provide signals representative of the roll and pitch of the exploration vessel. These signals are combined with the signals provided by the synchro units to yield measures of the cable yaw and pitch in an earth-relative coordinate system. As will be disclosed in greater detail subsequently, these measurements of yaw and pitch are used to develop models of varying degrees of complexity to represent the position of the streamer.

In the case of one of the models, there is employed additionally a magnetic compass, located at a point on the streamer remote from the exploration vessel. The signal provided by the magnetic compass, after correction for known magnetic variation in the area, is representative of the lateral orientation of the streamer at the compass location. The model comprises a two-line approximation of the position of the streamer. The first of the lines, passing through the stern of the exploration vessel, is constructed tangent to the measured yaw of the streamer at the vessel. The second of the lines is constructed parallel to the corrected compass indication and intersects the first line at a point estimated by an empirical relation.

Other models which may in some cases provide more accurate estimates of the location of the streamer will be discussed hereinbelow.

A more complete understanding of the invention, as well as of other features and advantages thereof, may be had by a consideration of the following detailed description in connection with the attached drawings wherein:

FIG. 1 is a plan view of a vessel towing a marine seismic streamer.

FIG. 2 illustrates the yaw and pitch angles of the streamer.

FIG. 3 shows a fixture for connecting the streamer to the vessel and for measuring the yaw and pitch angles.

FIGS. 4a and 4b illustrates the connection of the streamer to the fixture and the mounting of a tensiometer in the streamer.

FIG. 7 illustrates the position model of the preferred embodiment.

Figure 5:
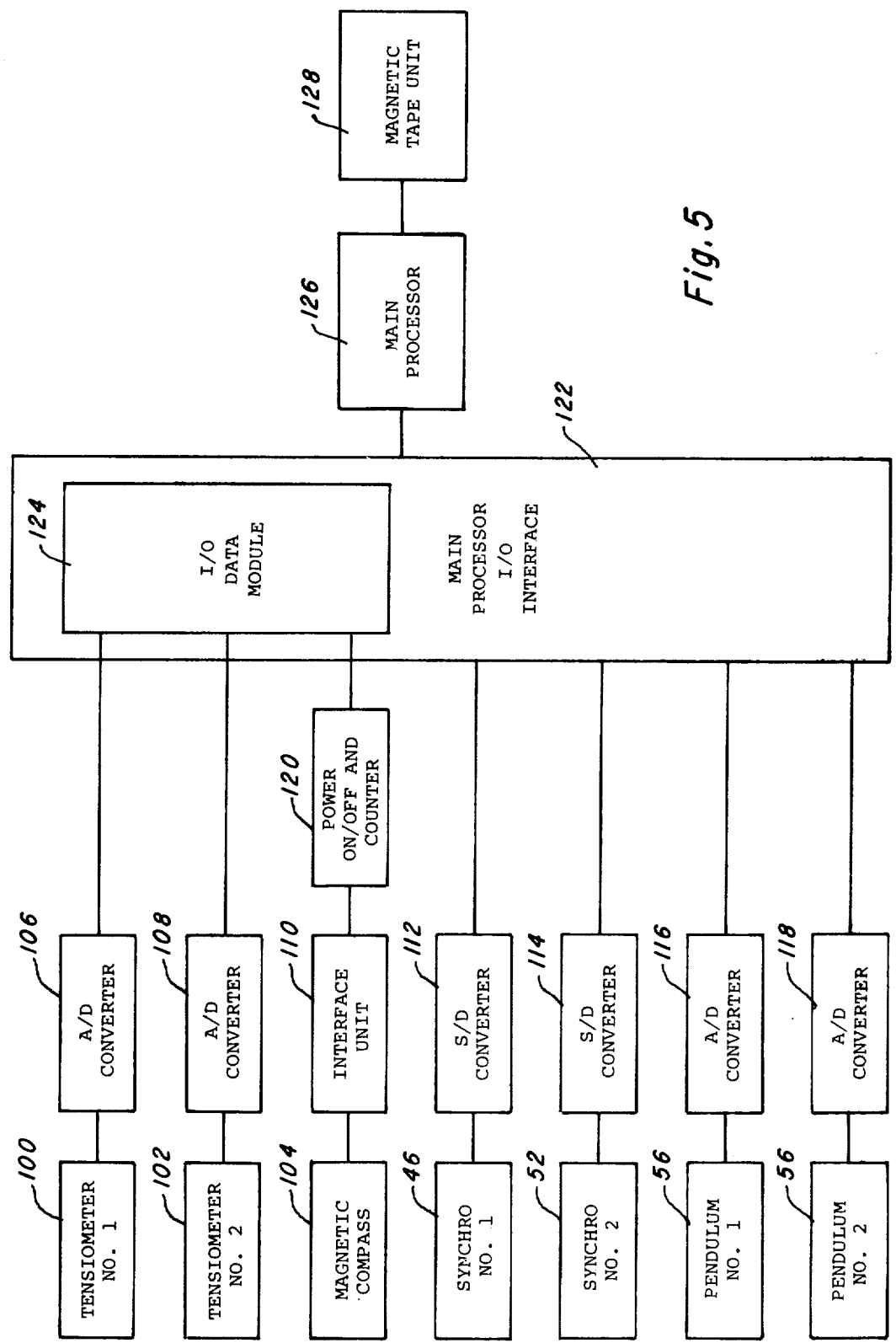
FIG. 5 is a block diagram of a stramer positioning system.

FIGS. 8a through 8i a flow chart for the generation of a position model in an alternate embodiment.

In FIG. 1, there is shown diagramatically an exploration vessel towing a marine seismic streamer, the view representing that which would be seen looking down on the surface of the sea from directly above. The vessel 10 travels along a track, which is represented by dashed line 12. While in FIG. 1 the longitudinal axis of vessel 10 is seen to be aligned with track 12, this will in general not be the case, the vessel generally being at some crab angle with respect to the track along which it is traveling. The position shown for seismic streamer 14 may be thought of as the location of the projection of the seismic streamer on the surface of the sea. Shown disposed at regular intervals along the arc length of the streamer, are a plurality of depth controllers 16 of the type previously discussed. While seismic streamers are commonly constructed to be approximately neutrally buoyant, the depth controllers 16 ensure that the portions of the cable at which they are affixed will be maintained at a constant predetermined depth below the surface of the sea. Thus, it will be seen that while the portion of the streamer adjacent vessel 10 will be affixed to the vessel at a point above the surface of the sea, the portion of the streamer at the first depth controller 16 will be maintained at the aforementioned predetermined depth. At the tail end of streamer 14, that is the end most remote from vessel 10, the streamer is affixed to a tail buoy 18, which serves to maintain the tail end of streamer 14 at the surface of the sea.

Line 20 in FIG. 1 is constructed in the horizontal plane of an earth-relative coordinate system and is tangent to the projection of streamer 14 on the surface of the sea. The point of tangency is the point at which streamer 14 is attached to vessel 10. Line 20 along with the longitudinal axis of vessel 10 define an angle $\theta$, which will be referred to as the yaw of the cable at the vessel 10. With the attitude of vessel 10 shown in FIG. 1, the longitudinal axis of the vessel lies along track 12.

Yaw angle $\theta$, as well as pitch angle $\phi$, are further illustrated in FIG. 2 which shows a unit vector 22. Unit vector 22 is codirectional with the streamer at the point where the streamer is attached to vessel 10, this point being given by the origin of the coordinate system in FIG. 2. In the earth-relative coordinate system illustrated in FIG. 2, the x-axis is coincident with the longitudinal axis of vessel 10, the longitudinal axis of vessel 10 being assumed, for the moment, to be codirectional with the track 12 of the vessel. The z-axis, which also lies in the horizontal plane, is the transverse axis of the vessel, while the y-axis is the vertical axis. The projection of unit vector 22 on the horizontal plane is illustrated by dashed vector 24, while the projection of unit vector 22 on the x-axis is represented by that portion of the x-axis terminating at point 26. It will again be seen from FIG. 2 that yaw angle $\theta$ is the angle between the horizontal projection of the streamer at the vessel and the ship's longitudinal axis. Pitch angle $\phi$ is the angle between the unit vector, representing the streamer at the point where it meets the vessel, and the horizontal projection of this unit vector.

An apparatus for the measurement of yaw angle $\theta$ and pitch angle $\phi$ at the stern of vessel 10 is illustrated in FIG. 3, generally at 30. The apparatus includes a support structure 32, which is fixedly attached to the deck at the stern of vessel 10, by means of mounting bolts 34. Bracket 36 is coupled to support structure 32 by means of universal joint 38. Cable 40 is coupled to bracket 36 by means of pulley 42. As seen in FIG. 4a, cable 40 is coupled at its other extremity to an exchange tool 70, which in turn supports the end of seismic streamer 14, adjacent vessel 10. Since universal joint 38 permits two degrees of freedom between bracket 36 and support structure 32, it will be seen from the foregoing that the face 44 of bracket 36 will be maintained at all times normal to the unit vector which represents the orientation of that portion of seismic streamer 14, adjacent vessel 10. Accordingly, the orientation of bracket 36, relative to support structure 32, is seen to be directly representative of the orientation of seismic streamer 14, relative to vessel 10.

Rotation of bracket 36, relative to support structure 32, about an axis parallel to the vertical axis of vessel 10, is sensed by synchro unit 46. This angular rotation is coupled from universal joint 38 to synchro unit 46 by means of flexible shaft 48. As a result, the electrical signal provided by synchro unit 46 on electrical cable 50, is representative of the yaw angle $\theta$ of streamer 14, relative to a ship's coordinate system.

In a similar manner, rotation of bracket 36, relative to support structure 32, about a transverse axis, is coupled by a second flexible shaft (not shown) to synchro unit 52, which provides on electrical cable 54 a signal representative of the pitch $\phi$ of seismic streamer 14. Again, the signal on electrical cable 54 represents the pitch $\phi$ measured in a ship-relative coordinate system. The synchros in units 46 and 52 may each be of a type commercially available as Model No. 1802880 from Sperry Marine Systems.

In the preferred emboidment, it will be desired that the yaw angle $\theta$ and pitch angle $\phi$ be expressed in an earth-relative coordinate system. Accordingly, there is rigidly attached to support structure 32, a pendulum unit 56. Pendulum unit 56 contains a first pendulous potentiometer which is constrained in one dimension, so as to be capable of rotating freely only about the longitudinal access of vessel 10. It will be seen, therefore, that this first potentiometer is sensitive to roll maneuvers of vessel 10. Pendulum unit 56 contains a second pendulous potentiometer, which is also constrained in one dimension, so as to be able to rotate freely only about the transverse axis of vessel 10. Accordingly, this second potentiometer is sensitive to pitch maneuvers of vessel 10. The two electrical signals provided by these two potentiometers are available on electrical connector 58 for further processing. A device satisfactory for use as the pendulous potentiometer in unit 56 is commercially available from Humphrey Inc. of San Diego, California as Model No. CP17-0601-1.

Again, referring to FIG. 2, it will be seen that the x, y, and z components of unit vector 22 will have the values shown in equation (1), where $\theta$ is the cable yaw angle and $\phi$ is the cable pitch angle, both in an earth-relative coordinate system. The electrical signals appearing on electrical cables 50 and 54, respectively, however, are representative of the cable yaw and pitch angles relative to the ship's coordinate system, whose longitudinal, vertical, and transverse coordinate axes will be labeled 1, $v$, and $t$, respectively. The 1, $v$, and $t$ components of unit vector 22 are given by equation (2), where $\theta_s$ and $\phi_s$ are the cable yaw and pitch angles relative to the ship's coordinate system, these angles being represented by the signals appearing on electrical cables 50 and 54.

$$\overline{U}_{22} = \begin{Bmatrix} \cos \Phi \cos \Theta \\ \sin \Phi \\ \cos \Phi \sin \Theta \end{Bmatrix} \quad (1)$$

$$\overline{U}_s = \begin{Bmatrix} \cos \Phi_s \cos \Theta_s \\ \sin \Phi_s \\ \cos \Phi_s \sin \Theta_s \end{Bmatrix} \quad (2)$$

Unit vectors $\overline{u}_{22}$ and $\overline{u}_s$ are related by transformation matrix [T] as shown in equation (3).

$$\overline{u}_{22} = [T]\overline{u}_s \quad (3)$$

The individual elements of transformation matrix [T] are given in equation (4).

$$[T] = \begin{bmatrix} \cos P & -\sin P & 0 \\ \dfrac{\sin P \cos R}{D} & \dfrac{\cos P \cos R}{D} & \dfrac{\sin R \cos P}{D} \\ \dfrac{-\sin R \sin P \cos P}{D} & \dfrac{-\sin R \cos^2 P}{D} & \dfrac{\cos R}{D} \end{bmatrix} \quad (4)$$

where: $D = (1 - \sin^2 R \sin^2 P)^{\frac{1}{2}}$.

In equation (4), the quantities R and P are the ship roll and pitch angles, respectively, these angles being represented by the signals appearing on electrical connector 58. The signals appearing on electrical connectors 50, 54 and 58 are combined in accordance with equation (3), so as to provide the x, y, and z components of unit vector 22 as shown in equation (1).

The individual components of the cable unit vector $\overline{u}_{22}$, given in equation (1), are combined as shown in equation (5) to expressly yield the cable yaw and pitch angles $\theta$ and $\phi$.

$$\theta = \tan^{-1}(U_y/U_x); \quad \phi = \sin^{-1}(U_y) \quad (5)$$

Where $U_x$ is the x componeent of $\overline{U}_{22}$;
$U_y$ is the y component of $\overline{U}_{22}$; and
$U_z$ is the z component of $\overline{U}_{22}$.

To this point, the yaw angle $\theta$ is measured relative to the longitudinal axis of vessel 10. The angle $\theta$ is further combined with the heading angle of vessel 10 as provided by a gyrocompass, which comprises a portion of the ship's navigational system to re-express the yaw angle $\theta$ relative to north. It will be assumed from this point on that the computed yaw angle $\theta$ has been so corrected to be relative to north.

Fixture 30 cooperates with the coupling structure illustrated in FIG. 4a to couple the streamer 14 to the stern of vessel 10. With reference to FIG. 4a, cable 40 connects pulley 42 to exchange tool 70. Streamer 14 is rigidly affixed to exchange tool 70 at point 72. Emerging from streamer 14 at point 72 where it engages exchange tool 70 is a cable bundle 74. In a typical streamer arrangement, cable bundle 74 includes a pair of electrical conductors for each of the hydrophone groups disposed along streamer 14. In the present embodiment, cable bundle 74 will additionally include electrical conductors leading to tensiometers and a magnetic compass which are also located at points disposed along streamer 14. As is well known in the art, cable bundle 74 is coupled to signal recording and processing equipment located aboard vessel 10.

In the preferred embodiment, there is disposed a first tensiometer within streamer 14 at a point 74 near exchange tool 70. FIG. 4b is an exploded view of the interior of streamer 14 in the vicinity of the first tensiometer. A suitable tensiometer is a Transducer Load Cell Model No. WML2-251-10K-3926, commercially available from Transducers, Inc. of Whittier, California. In FIG. 4b, tensiometer 76 is seen to have a generally hexagonal cross-section. Located at either end of tensiometer 76, as expressly shown at 78, is a threaded recess by means of which tensiometer 76 is coupled to streamer 14. Four pins 80 are provided to permit external electrical connection to the Wheatstone bridge of tensiometer 76. A bracket 82 is provided to couple one end of streamer 14 to tensiometer 76. Bracket 82 includes a threaded stud 84 which engages with one of threaded recesses 78, so as to rigidly affix bracket 82 to tensiometer 76. The three stainless steel strain members 86, which comprise the tension bearing members in a conventional seismic streamer, are affixed to bracket 82 at points 88. Portions of bracket 82 are cut away as at 90 to permit the cable bundle of the streamer to pass through bracket 82, along side tensiometer 76, and on up the streamer 14 to vessel 10. Additional electrical leads connected to pins 80 also become part of the cable bundle leading to vessel 10. A second bracket similar to bracket 82 is provided to couple the forward end of streamer 14 to the forward end of tensiometer 76. As is well known in the art, the entire seismic streamer 14, including the portion comprising tensiometer 76, is encased within a sleeve or jacket which is typically extruded from a material such as polyvinylchloride.

It is common practice with marine seismic streamers to include in the portion of the streamer between the tow vessel and the first depth controller, a "stretch" section. The stretch section differs from the conventional streamer section in that the stainless steel strain members are replaced by nylon strain members which are relatively elastic. The presence of the stretch section reduces the probability of shock damage to the streamer and provides isolation of the hydrophones from mechanical noises induced by the tow vessel. In order to know the precise arc distance from the vessel to any point on the streamer beyond the stretch section, however, it is necessary to know the percentage stretch of the stretch section.

Tensiometer 76 provides a signal representative of the longitudinal tension acting on streamer 14 at the point where the streamer is coupled to the stern of vessel 10. In the preferred embodiment, a second similar tensiometer is located in streamer 14 in the vicinity of the depth controller 16 which is located nearest vessel 10. As discussed below in greater detail, the tension measurements provided by these two tensiometers may be employed to determine the degree of elastic expansion of that portion of streamer 14 intermediate to the two tensiometers.

A magnetic compass is disposed in streamer 14 at a point sufficiently remote from vessel 10 to ensure that distortions of the earth's magnetic field by the field of vessel 10 will not introduce unacceptable errors in the sensed magnetic "north". In the preferred embodiment, for example, the magnetic compass is located at a point about midway along the length of streamer 14. A suitable magnetic compass is Model 314 Heading Sensor, available from Digicourse, Inc. This particular model of magnetic compass has the desirable feature of being gimballed to be rotatable through a full 360° about the longitudinal axis of streamer 14. As a result, the twists which commonly occur along the length of streamer 14, do not interfere with proper operation of the magnetic compass. Additional electrical conductors in the cable bundle couple the electrical signal provided by the magnetic compass to processing equipment aboard vessel 10.

The interconnection of the system components comprising the preferred embodiment of the invention is illustrated in the block diagram of FIG. 5. The various parameter sensing units employed in the system include tensiometers 100 and 102, magnetic compass 104, synchro units 46 and 52, and the two pendulous potentiometers in pendulim unit 56. The analog signals provided by tensiometers 100 and 102 are digitized in A/D converters 106 and 108, respectively. Similarly, the analog signals provided by the two potentiometers of pendulum unit 56 are digitized by A/D converters 116 and 118. The A/D converters may be any of a wide variety of commercially available units, one such suitable unit being the Model No. AD2003 panel meter with digital output produced by Analog Devices.

Magnetic compass 104, which as previously mentioned is a Model 314 Heading Sensor, is coupled to interface unit 110. In the preferred embodiment, interface unit 110 is a Model 251 Heading Sensor Interface Unit also produced by Digicourse, Inc. Interface unit 110 is coupled to block 120 wherein the pulse train provided by magnetic compass 104 and interface unit 110 is counted to obtain a digital indication of the compass reading. Unit 120 also serves to selectively switch power, under control of main processor 126, to magnetic compass 104 and interface unit 110. In a preferred method of operation, power to the magnetic compass is switched off at those times when seismic data are being acquired, so as to eliminate the possibility of noise contamination of the seismic data. The magnetic compass is powered up to provide a compass reading sample just prior to the initiation of a seismic disturbance and recording of the resulting seismic data.

The analog signals provided by synchro units 46 and 52 are digitized in S/D converters 112 and 114, respectively. S/D converters 112 and 114 may each be a Model M5000M36/3DP Synchro-to-Digital Converter manufactured and sold by AstroSystems, Inc. of Lake Success, New York.

The digital signals generated as discussed hereinabove are combined in main processor 126, so as to provide models of the streamer position. The main processor 126 may be a Model 980A computer, maufactured and sold by Texas Instruments Incorporated of Dallas, Texas. As illustrated by block 122, communication of data samples to main processor 126 is by means of a main processor I/O interface 122. The provision of the I/O interface to interrogate the various digital samples and communicate the digital samples to main processor 126 is well understood by those skilled in the art and requires no further elaboration here. By way of example, however, a portion of main processor I/O interface 122 has been expressly designated in FIG. 5 as I/O Data Module 124. This portion of the interface, which services the tensiometer and magnetic compass signals, comprises a Model 961648-2 I/O Data Module produced and sold by Texas Instruments Incorporated. Main processor I/O interface 122 periodically, i.e., once each second, acquires a data sample from each of the input units and passes these data samples to main processor 126 wherein the data samples are used to generate a model of the streamer position. The various data samples, as well as the model, are recorded on magnetic tape unit 128. Magnetic tape unit 128 may be a Model TI-979 magnetic tape unit produced and sold by Texas Instruments Incorporated.

Figure 6:
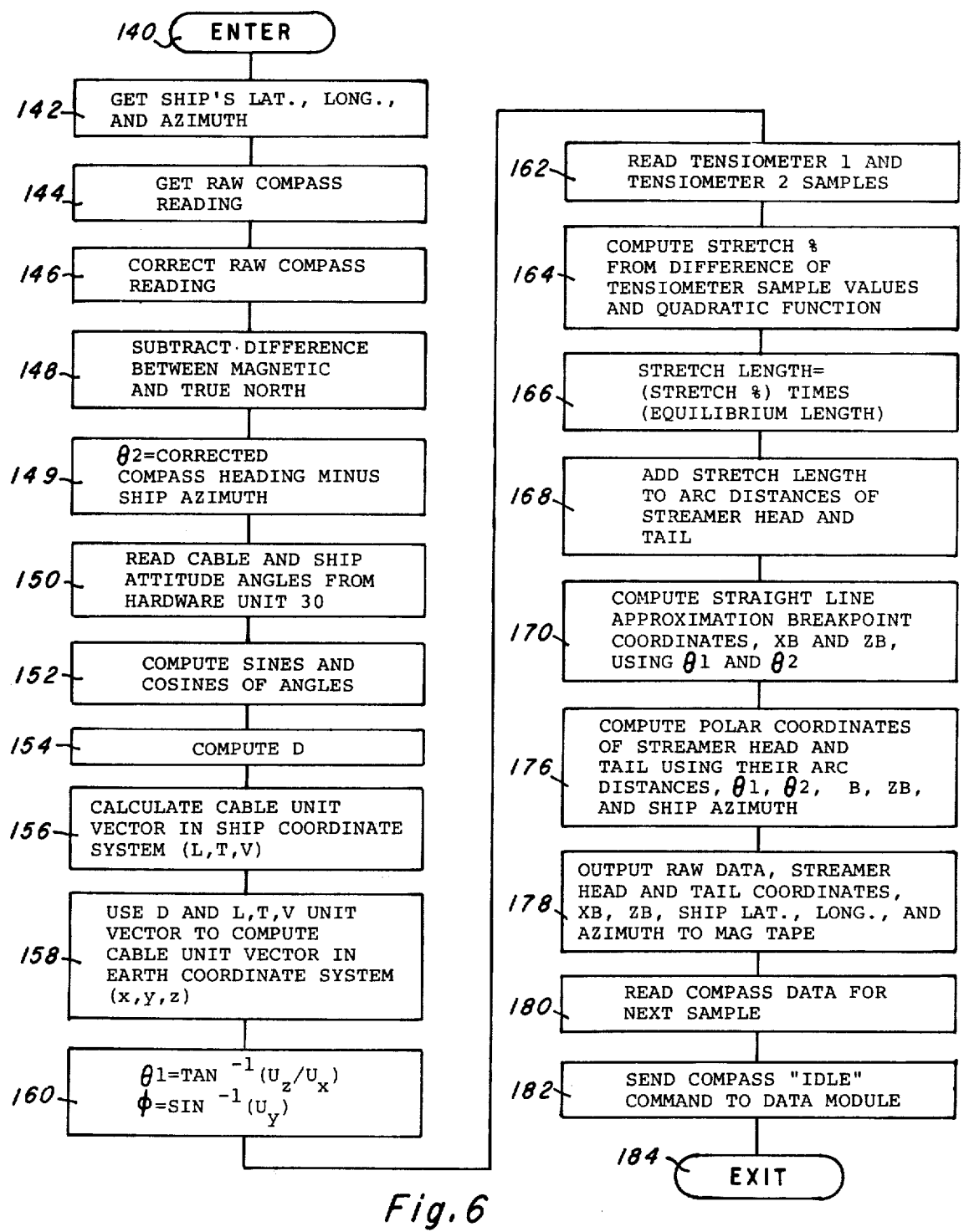
FIG. 6 is a flow chart for the generation of a position model in the preferred embodiment.
Figure 8A:
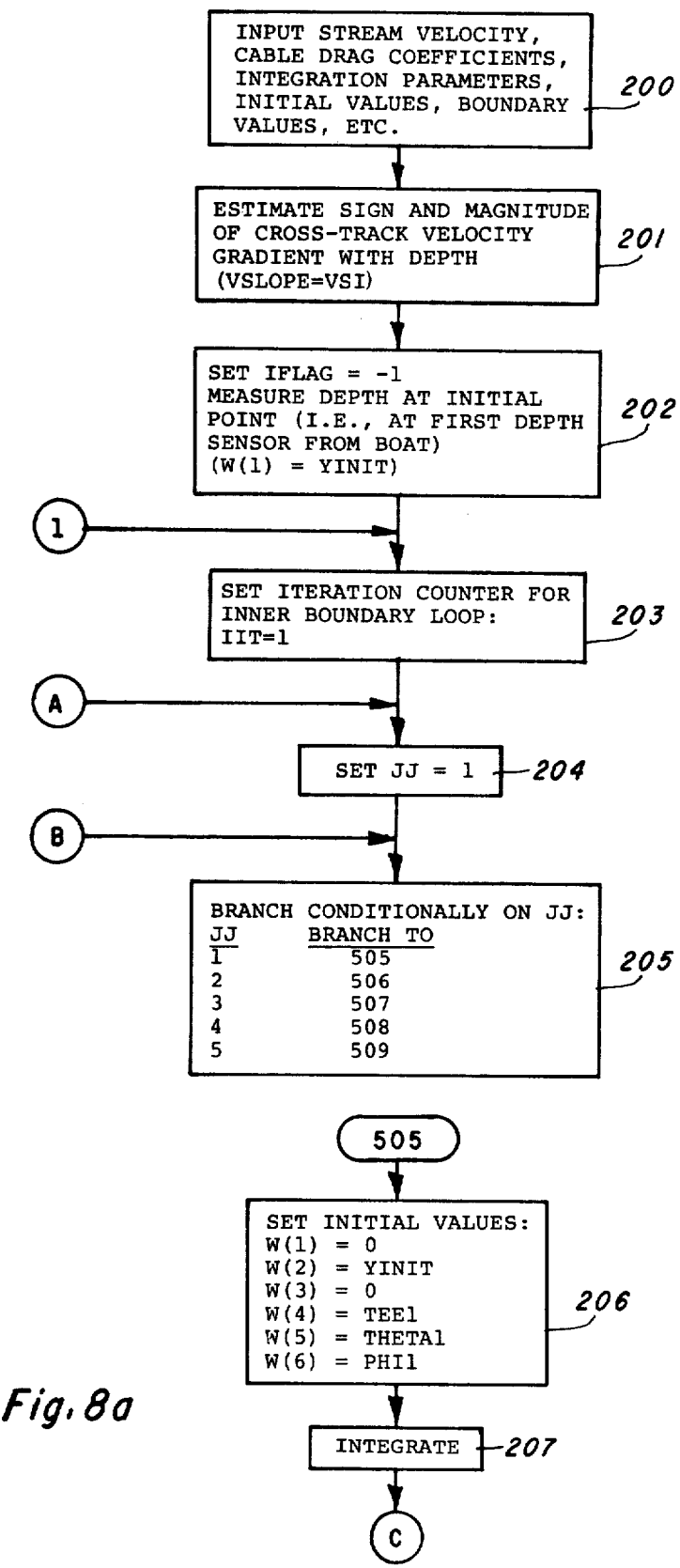
Figure 8B:
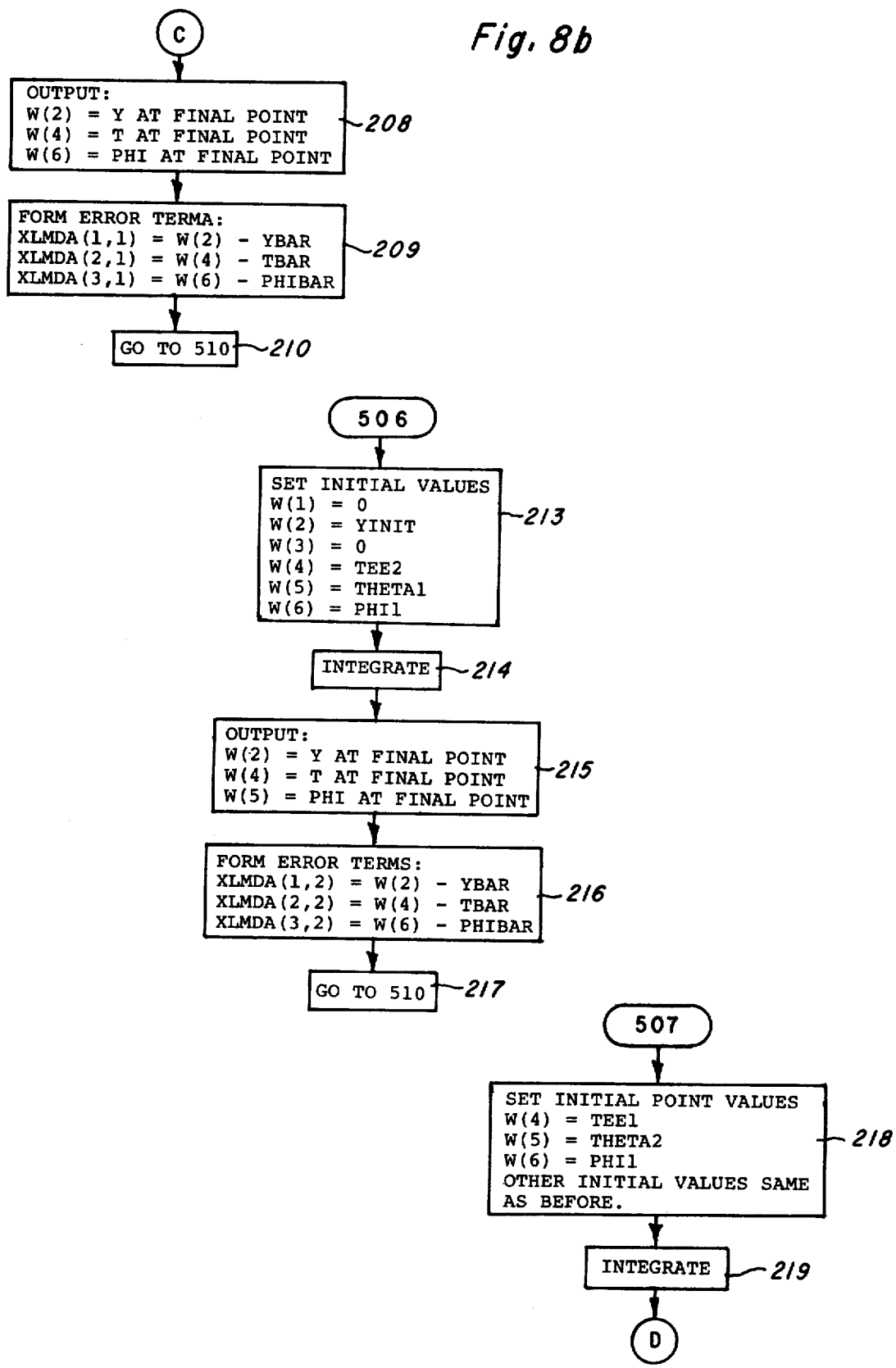
Figure 8C:
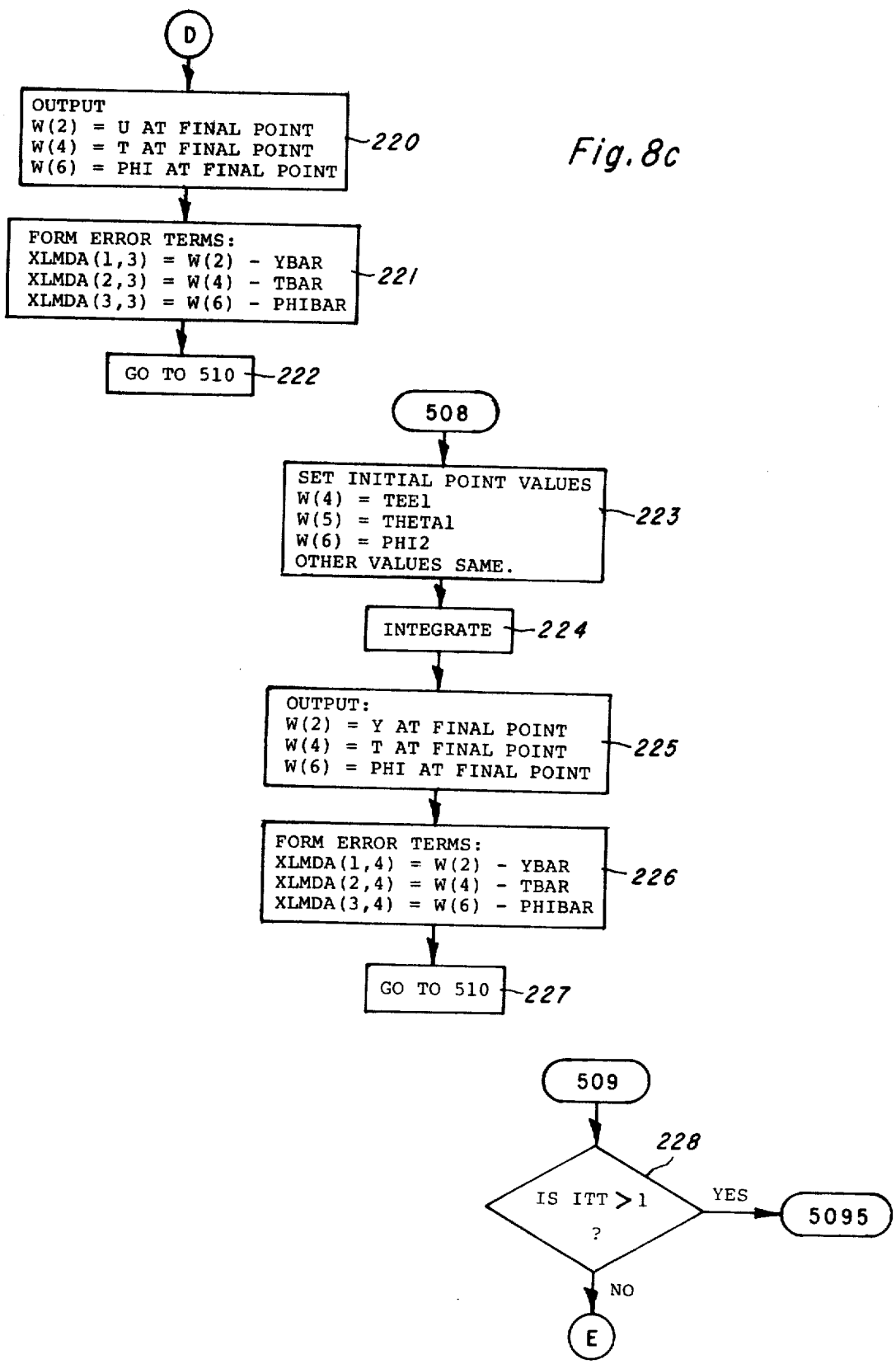
Figure 8D:
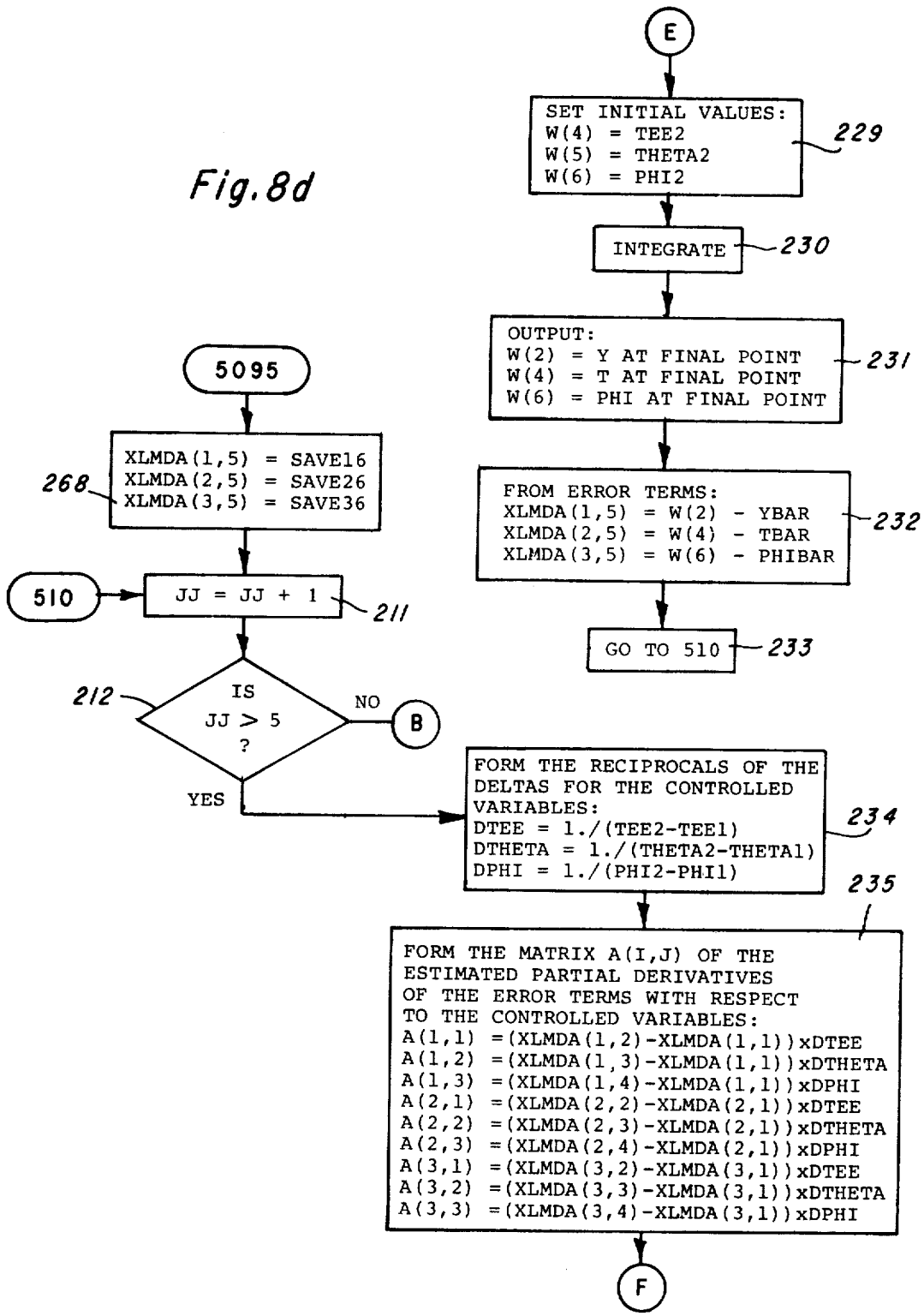
Figure 8E:
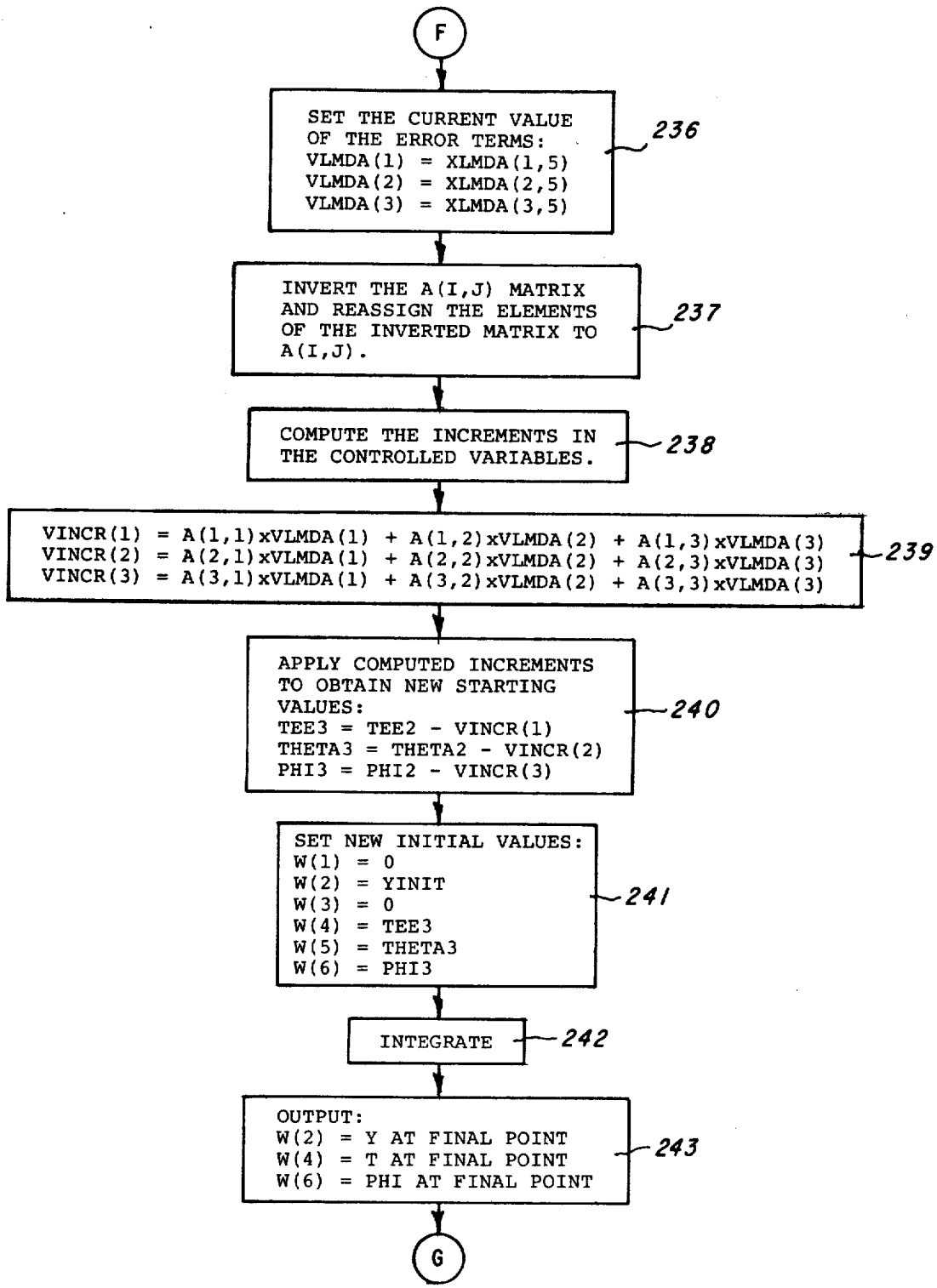
Figure 8F:
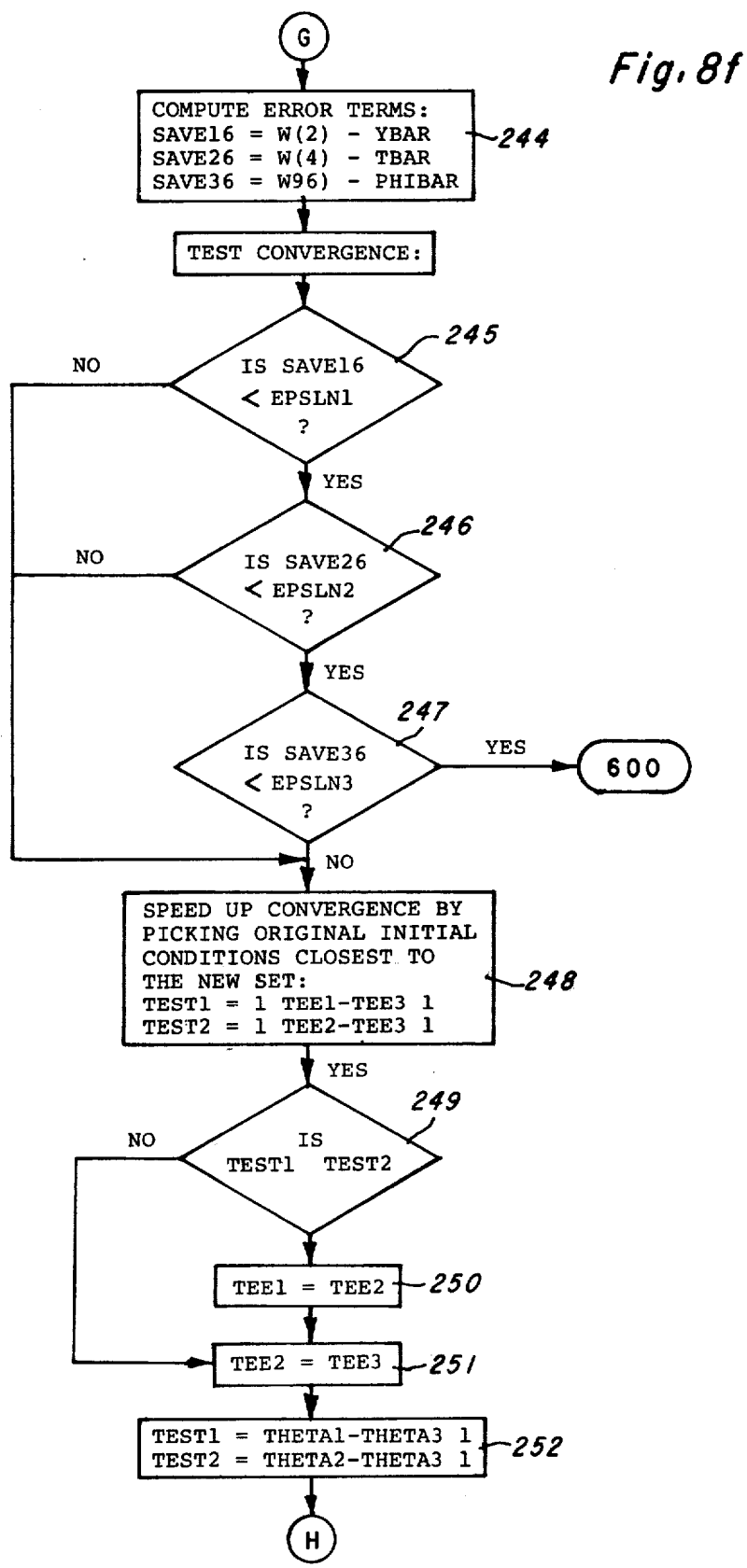
Figure 8G:
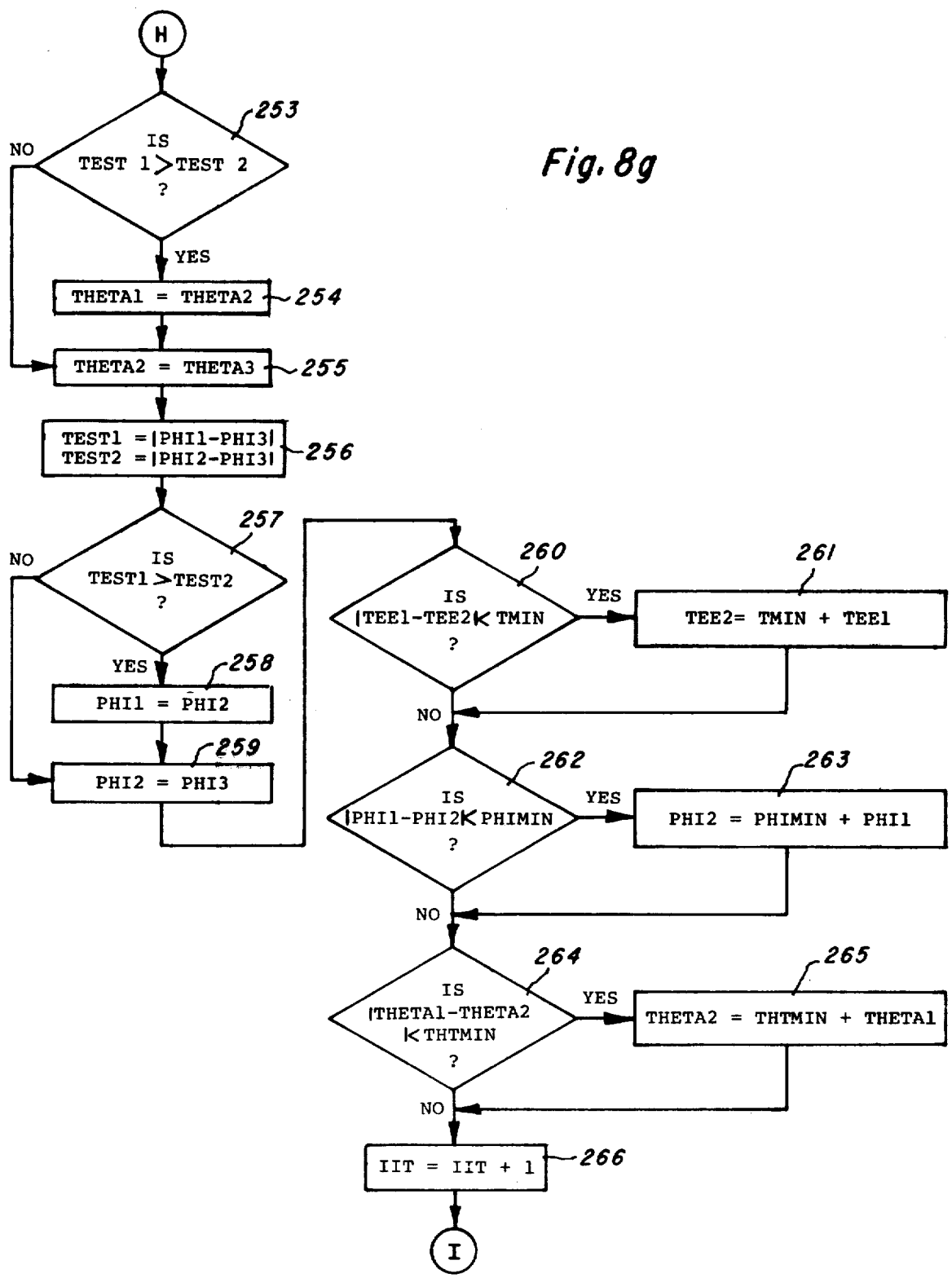
Figure 8H:
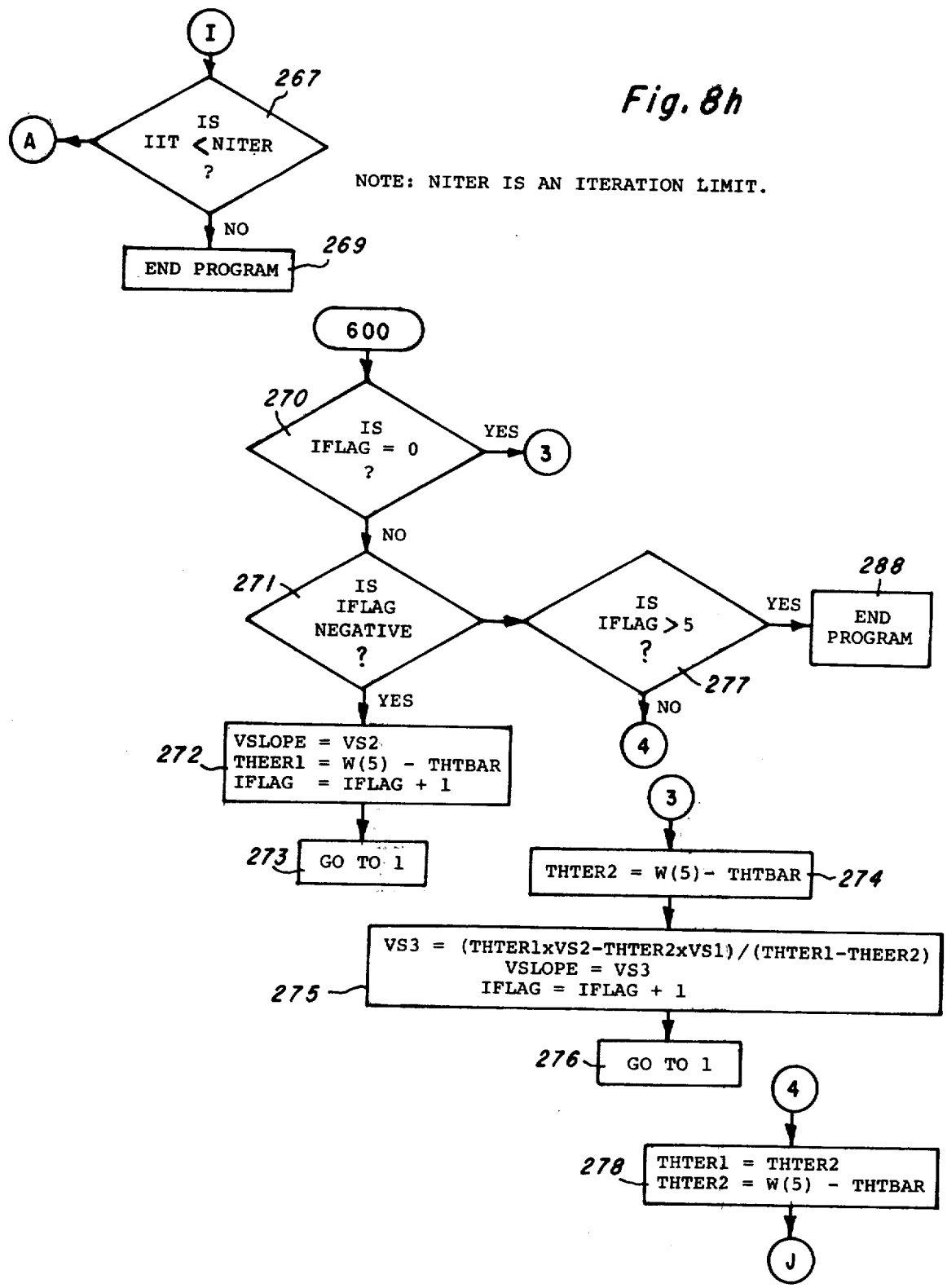
Figure 8I:
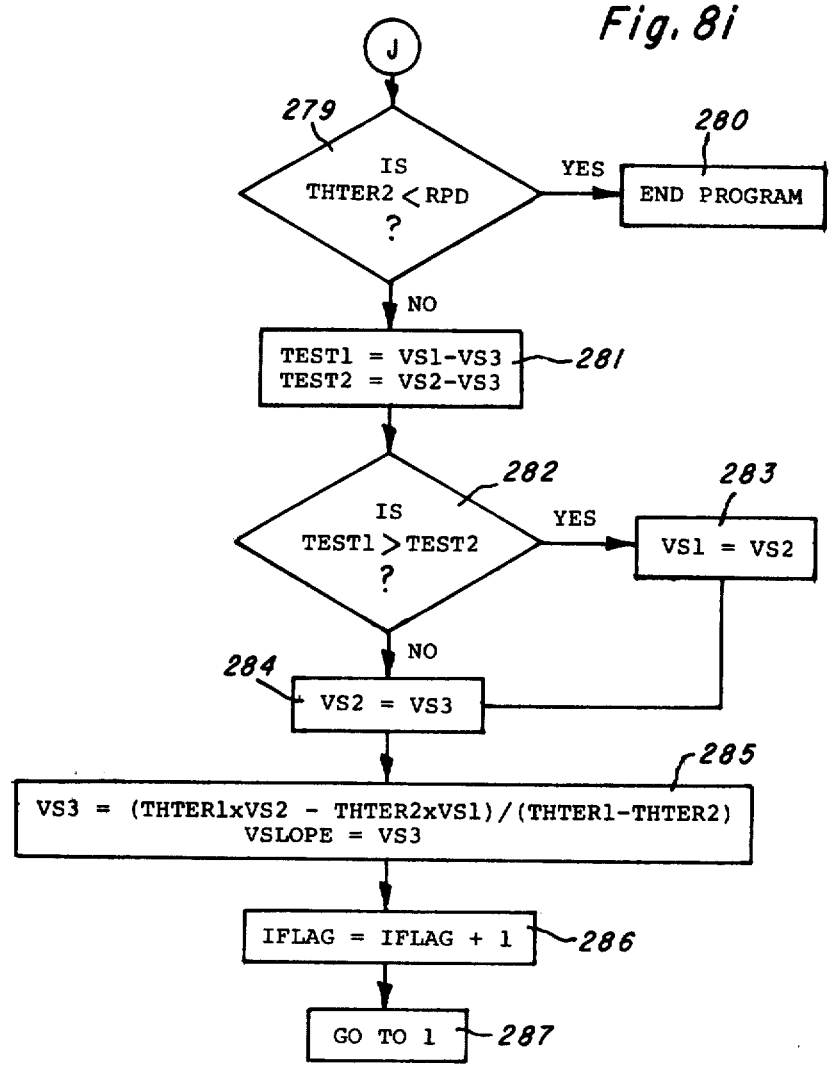

The operations performed by main processor 126 in the preferred embodiment of the invention are illustrated by the flow diagram of FIG. 6. The processing used to obtain the streamer model for each set of samples from the various input units is initiated by entry at 140. At step 142, the streamer positioning system acquires the instantaneous latitude, longitude, and azimuth of vessel 10. In the preferred embodiment, the streamer position system functions in cooperation with the aforementioned GEONAV* seismic marine navigation and location system. In particular, main processor 126 is shared by the streamer positioning system and the marine navigation and location system. As a result, main processor 126 will contain at all times the most recent measurements of ship's latitude, longitude and azimuth, so that these quantities are always available for use by the streamer positioning system as at step 142. As will be discussed henceforth in greater detail, the ship's azimuth is used to permit computation of the streamer model in an earth-relative coordinate system. The invention, however, is not so limited and may be used in the case where ship's azimuth is not available to provide a streamer model expressed in a ship-relative coordinate system.

At step 144, main processor 126 acquires the most recent data sample from magnetic compass 104 which is positioned along streamer 14. At step 146, the raw compass reading is corrected to remove compass inaccuracies. Prior to locating compass 104 in streamer 114, the compass will have been tested to obtain an empirical curve expressing the true magnetic reading as a function of the raw compass reading. This empirical curve is preloaded into main processor 126 in the form of an approximation comprising eight linear segments. At step 146, main processor 126 applies the raw compass reading to this curve to determine the true magnetic reading. At step 148, the magnetic variation is removed from the compass reading to provide a heading expressed relative to true North. Magnetic variation is input to main processor 126 by an operator and may be updated periodically so that the magnetic variation employed by the main processor is appropriate for the area under exploration.

At step 149, the ship's azimuth is subtracted from the adjusted compass heading to provide the angle $\theta 2$ which expresses the orientation of the streamer relative to the ship's coordinate system.

At step 150, the processor acquires the most recent samples of streamer yaw and pitch, and of the ship's roll and pitch from fixture 30. At 152, the sines and cosines of these angles are determined, these trigonometric functions being employed as in equations (1) - (4) to obtain a streamer unit vector expressed in ship-relative coordinates. At step 154, the quantity D, which is defined in equation (4) is computed. At step 156, The processor determines the cable unit vector expressed in a ship-relative coordinate system as defined by equation (2). At step 158, the rotation represented by equation (3) is accomplished. Then, using the components of the cable unit vector expressed in an earth-relative coordinate system, the cable yaw angle $\theta 1$ and pitch angle $\phi$ are determined at step 160 in accordance with equation (5).

At step 162, the most recent samples provided by tensiometers 1 and 2 are acquired by main processor 126. At step 164, the difference between the tensions measured by tensiometers 1 and 2 are used to determine the percentage of stretch in the stretch section of the cable. It has been determined empirically that the percentage stretch, when expressed as a function of the difference in tension at the two ends of the stretch section, may be approximated by a quadratic function. The appropriate quadratic function is preloaded into main processor 126 and employed at step 164 in connection with the difference between the two measured tensions to yield the percentage stretch. At step 166, this percentage stretch is multiplied by the equilibrium length of the stretch section to provide the stretch length of the streamer. At step 168, this stretch length is added to the arc distances of the streamer head and tail, that is, the lengths along the unstressed streamer from the stern of vessel 10 to the head and tail, respectively, of the active portion of streamer 14. The streamer head in this context is that point along the streamer at which are located the hydrophones nearest vessel 10.

The two-line approximation comprising the streamer position model in the preferred embodiment of the invention is illustrated in FIG. 7. The first line 172 of the model passes through the stern of vessel 10 and is oriented at an angle $\theta 1$ with respect to the x or longitudinal axis of vessel 10. The second line 174 is at an angle $\theta 2$ with respect to the x axis. The point at which lines 172 and 174 intersect has ccordinates (XB, ZB), which are estimated at step 170 of FIG. 6 by the empirical relation given in equation (6).

$$XB = K (\tan \theta 2 - 1)/(\tan \theta 1 - \tan \theta 2);$$
$$ZB = XB (\tan \theta 1)$$

where:

$$K = 2.586 \, (\theta 1/9.08)^4 \tag{6}$$

At step 176, the polar coordinates in a North-relative system of the head and tail of the streamer are computed, using their arc distances, the angles $\theta 1$ and $\theta 2$, the coordinates XB and ZB, and the ship azimuth. A transformation is also applied to the location of the breakpoint (XB, ZB) to express this breakpoint in the polar coordinate system. At step 178, the raw data, the streamer head and tail locations, the breakpoint location in polar coordinates, and the ship latitude, longitude and azimuth are output to the magnetic tape unit 128.

At step 180, the next sample from the magnetic compass 104 is read in preparation for the next computation. After this next sample from the compass is acquired, a compass "idle"command is sent to the data module in step 182. As explained previously, this places the magnetic compass in a powered down mode during acquisition of seismic data. Termination of the model generation occurs at exit point 184. The series of operations illustrated by the flow diagram of FIG. 6 is repeated at periodic intervals, typically once per second. In this way, there is placed on the magnetic tape the raw data as well as a periodically updated model of the instantaneous streamer position.

There will next be discussed an alternative method and system for providing a streamer position model using the outputs of the various sensors of the system illustrated in FIG. 5. In the aforementioned paper by John Bedenbender, there are presented six differential equations of equilibrium for a seismic streamer. These equations are reproduced here as equation (7) - (12).

$$\frac{dT}{ds} + F - W\sin\Phi = 0 \tag{7}$$

$$T\cos\Phi \frac{d\Theta}{ds} + H = 0 \tag{8}$$

$$T\frac{d\Phi}{ds} + G - W\cos\Phi = 0 \tag{9}$$

$$\frac{dx}{ds} = \cos\Phi \cos\Theta \tag{10}$$

$$\frac{dy}{ds} = \sin\Phi \tag{11}$$

$$\frac{dz}{ds} = \cos\Phi \sin\Theta \tag{12}$$

Where:

x, y and z are rectangular coordinates,

T is cable tension, s is arc length along the streamer,

W is weight per unit length of the streamer in the fluid medium, $\theta$ is the angle between the positive x axis and the vertical plane containing element ds, $\Phi$ is the angle between ds and the x-z plane in the vertical plane of element ds, F, H and G are hydrodynamic forces per unit length of streamer acting on ds in respective directions tangent to ds, normal to ds, and normal to vertical plane $\Phi$, and normal to ds in the vertical plane of $\Phi$.

In these equations, s the arc length along the streamer is the independent variable, while x, y, z, T, $\Phi$ and $\theta$ are the dependent variables. In many cases, including the present streamer positioning system, the initial values of some of the dependent variables and the hydrodynamic forces are not sufficiently known to permit a determinate numerical integration of the differential equations. The paper by Bedenbender presents a solution method which is applicalbe to some such problems. In the method, the unknown initial values are estimated from a general knowledge of the physical situation. Using these initial values, the differential equations are integrated along the streamer to a point at which certain of the dependent variables are known. The known values of dependent variables (boundary conditions) are compared with the values resulting from integration of the differential equations and the differences used in Newton-Raphson iteration technique to provide new estimates for the unknown initial values. The procedure is repeated iteratively using the new initial value estimates until the values produced by the integrated differential equations are within preselected distances of the known boundary conditions.

The aforementioned iterative solution technique has been extended for use with the input variables available in the seismic streamer positioning system. Integration of the differential equations begins at some point along the length of the streamer, for example, at the point nearest vessel 10 at which there is located one of the depth controllers 16 in FIG. 1. Since the depth controller maintains the cable at this point at a predetermined depth, the initial value of dependent variable $y$ is known. Depenent position variables $x$ and $z$ are arbitrarily assigned the value 0. Estimates of dependent variables $T$, $\Phi$ and $\theta$ are made, based on familiarity with conditions generally attending towing of the seismic streamer. Beginning with these initial conditions, the differential equations are numerically integrated along the streamer toward vessel 10 to produce solution values for the dependent variables at the stern of vessel 10. The solution values for dependent variables $y$, $T$ and $\Phi$ are compared with known values $\bar{y}$, $\bar{T}$, and $\bar{\Phi}$ at the stern of vessel 10; where $\bar{y}$ is the known elevation of the streamer at vessel 10; $\bar{T}$ is the tension measured by the tensiometer located at point 74 in FIG. 4a; and $\bar{\Phi}$ is the streamer pitch angle measured with the aid of fixture 30. In the Newton-Raphson iteration technique, this comparison is used to provide new estimates for the initial values of $T$ $\theta$ and $\Phi$ at the first depth controller. The iterative procedure is continued until the solution values for $y$, $T$ and $\Phi$ converge to within preselected thresholds of the known values.

In the ordinary case, the hydrodynamic forces F, H and G stemming from the velocity of the water relative to the streamer will not be known precisely. The streamer position is strongly influenced by cross-tract water velocity which is known to sometimes vary with depth. In performing the aforementioned iteration on initial conditions at the first depth controller, an initial cross-track velocity gradient is assumed. An outer Newton-Raphson iteration loop is performed to obtain better estimates of the cross-track velocity gradient. The dependent variable which is used in this outer Newton-raphson loop is the yaw angle $\theta$ at the stern of vessel 10. After the inner and outer loops have converged to provide satisfactory estimates of the three unknown initial conditions, as well as of the cross-track velocity gradient, the final integration of the differential equations using these improved estimates constitutes the model of streamer position for that position of the streamer over which the integration is performed.

Using the new estimates of initial conditions at the first depth controller as known values for the next segment of the streamer, that is, the segment between the first and second depth controllers, the procedure may be repeated to obtain refined estimates of the initial conditions at the location of the second depth controller. In this way, the solution may be stopped down the streamer, so as to obtain a model of the streamer position over its entire length.

Alternatively, as will be discussed hereinbelow, a hyperbolic curve may be fitted to the solution for that portion of the streamer between vessel 10 and the first depth controller.

A FORTRAN listing for implementing the iterative solution is appended hereto as Appendix A. The variables which appear in the FORTRAN program are defined in Table I. FIGS. 8a–i comprise a flowchart corresponding to the FORTRAN program.

With reference to FIG. 8 at step 200, various input quantities are listed. These include the input stream velocity and cable drag coefficients which serve to define the hydrodynamic forces occurring in the differential equations. Various parameters defining the resolution desired in the integration procedure are also established. Finally, estimates of the initial values for tension, yaw angle, and dip angle at the first depth controller, as well as known boundary values at vessel 10 for tension, yaw angle, dip angle and elevation are input. At step 201, a first estimate of cross-track velocity gradient VS1 is made and the variable VSLOPE is set equal to VS1. Step 202 initiates a counter IFLAG for the outer iteration loop and sets the initial Y value at the first depth controller to the predetermined depth maintained by this depth controller. At step 203, the inner loop iteration counter IIT is initiated. At 204, counter JJ is given an initial value of 1. The conditional branch represented by step 205 branches to point 505 when the value of JJ is equal to one. In step 206, the first set of initial values for tension, yaw angle, and dip angle at the first depth controller is assigned.

Using these initial values at step 207, the differential equations are numerically integrated along the streamer from the location of the first depth controller to the stern of the vessel 10. Any of the various methods of numercial integration may be used at this point, one suitable method being the Adams-Moulton prediction corrector method with a Runge-Kutta starter. This particular numercial integration method is implemented by subroutine RKAM for which the FORTRAN code is included in Appendix A.

The integration result in final values for the variables Y, T, and $\phi$ as shown at step 208. At step 209, the difference between these computed final values and the corresponding boundary conditions is determined. The flow then jumps from step 210 to point 510 of FIG. 8d from which, at step 211, the counter JJ is incremented by 1 and thereafter has the value 2. As a result, at 212, the answer to the test is "NO" and the flow loops back to point B of FIG. 8a. In this case, at step 205, the flow branches to point 506. The sequence of steps 213–217 is almost identical to the sequence of steps 206–210, the only difference being that in step 213, the initial value for tension TEE2 is set to a value slightly different than the value of TEE1 used at step 206. As a result, the error terms formed at step 216 correspond to a slightly different initial condition on tension than do the error terms computed at step 209. The flow than jumps from step 217 to point 510, the variable JJ is incremented again, flow loops back to point B, and ultimately branches to point 507. The initial values set at step 218 differ from those at step 206 in that the initial value for yaw angle is varied slightly, thereby leading to a third set of error terms at step 221. In a similar manner, after the flow loops back to point 508, the initial value on dip angle is varied slightly at step 223, thereby resulting in a fourth set of error terms at step 226. From step 227, flow jumps to point 510 and in this case at step 211, the counter JJ is incremented to have a value of 5. The test at step 212 is again failed and flow loops back to point B from which at step 205 the flow branches to point 509.

Since the flow at this point is passing through the inner boundary loop for the first time, the test at step 228 fails and a fifth set of initial values is established at step 229. It will be seen that the initial values set at step 229 are all slightly different than the values originally set at step 206. This results in a fifth set of error terms at step 232 and flow jumps from step 233 to point 510. Now, counter JJ is incremented to have a value of 6 at step 211 and the answer to test 212 is "YES" so that flow moves to step 234.

The various error terms XLMDA (I, J) resulting from the integrations performed in steps 206–233 are used in the aforementioned Newton-Raphson iterative technique to produce improved initial value estimates TEE3, THETA3, and PHI3, in accordance with matrix equation (13).

$$\begin{Bmatrix} TEE2 - TEE3 \\ THETA2 - THETA3 \\ PHI2 - PHI3 \end{Bmatrix} = \begin{bmatrix} A(1,1) \ A(1,2) \ A(1,3) \\ A(2,1) \ A(2,2) \ A(2,3) \\ A(3,1) \ A(3,2) \ A(3,3) \end{bmatrix}^{-1} \begin{Bmatrix} XLMDA(1,5) \\ XLMDA(2,5) \\ XLMDA(3,5) \end{Bmatrix} \quad (13)$$

The matrix elements A (I, J) are computed at steps 234 and 235 and are seen to be approximations to the partial derivatives of the error terms with respect to the three initial value quantities TEE, THETA, AND PHI. Thus, matrix equation (13) is implemented by steps 234–240 of the flow chart to yield the new initial value estimates TEE3, THETA3, and PHI3. The new set of initial value estimates is employed in steps 241–244 wherein the differential equations are again integrated to obtain a set of error terms SAVE16, SAVE26, and SAVE36 corresponding to the new set of initial values. These error terms, representing errors in the Y value, the tension value, and the cable dip angle value, are tested in steps 245–247 against preselected upper bounds EPSLN1, EPSLN2, and EPSLN3. If any of these bounds are exceeded by an error term, flow passes to step 248.

At step 248, in preparation for the next pass through the inner loop, the distances of TEE3 from TEE1 and TEE2 are determined. In steps 249 through 251, the quantity TEE2 for the next pass through the inner loop is set to the newly computed quantity TEE3. The quantity TEE1 for the next pass through the loop may or may not be modified in accordance with the result of the test at step 249. Similarly, in steps 252–259, the initial conditions on THETA and PHI for the next pass through the inner loop are chosen closest to the newly computed initial values.

At step 260, the difference between the new quantities TEE2 and TEE1 is tested against a minimum TMIN. If this difference becomes excessively small, it will lead to an unbounded result at step 234. Accordingly, if the answer to the test at step 260 is "YES", the new value TEE2 is adjusted at step 261 to be at least a minimum distance from TEE1.

Similarly, the initial condition sets for PHI and THETA are tested at steps 262 through 265 and adjusted to minimum differences if necessary. At step 266 the inner boundary loop counter IIT is incremented and is tested at step 267 against an iteration loop counter NITER. If the iteration limit is not exceeded at step 267, flow returns to point A for the next pass through the inner boundary loop. On the second and subsequent passes through the inner boundary loop, the only difference from the first pass through this loop stems from the fact that the integration and error evaluation performed in steps 229–233 will already have been performed in the last pass through the loop. Accordingly, at step 228 on these subsequent passes flow branches to point 5095 where these particular error terms are set equal to the values computed in the last pass through the inner boundary loop. The inner boundary loop is exited in one of two ways. If convergence is not ultimately achieved, the iteration limit will be exceeded at step 267 and flow proceeds to step 269 where the program is ended. In the normal mode of operation, prior to this event convergence will be achieved, and the tests at steps 245, 246, and 247 will all be satisfied thereby causing flow to branch to point 600. It will be recalled that the value of VSLOPE used in all of the estimations to this point had been set equal to an initial estimate VS1 in step 201. Also, the counter on the outer loop IFLAG was set equal to −1 at step 202. Accordingly, the test at step 270 will fail, but the test at step 271 will result in a "YES" answer so that flow moves to step 272. Here the quantity VSLOPE is set to a new estimate, VS2, in preparation for the next pass through the outer loop. The error in theta, THTER1, corresponding to the cross-track velocity gradient VS1 is also computed at step 272 and the outer loop counter incremented by one. Flow then returns from step 273 to point 1 to initiate the inner boundary loop for the new value of VSLOPE, that is VS2.

Once again, after convergence is achieved within the inner loop, flow will return to point 600. In this case, the counter IFLAG will have the value 0 and the test at step 270 will result in a "YES" answer. Flow moves to point 3 and at step 274 the error in theta, THTER2, corresponding to the cross-track velocity gradient VS2 is computed. The two velocity gradient estimates, as well as the resulting error terms, are combined at step 275 to yield an improved estimate of cross-track velocity gradient VS3. The quantity VSLOPE is set equal to VS3 and the counter incremented at step 275 and flow moves from step 276 back to point 1 for the next pass through the inner boundary loop.

Once again, after convergence is achieved within the inner boundary loop, flow returns to point 600. In this case, however, the counter IFLAG will have the value 1 and none of tests 270, 271, or 277 will be satisfied. Accordingly, flow moves to point 4. At step 278 the quantities THTER1 and THTER2 are set to the errors corresponding to velocity gradients VS2 and VS3, respectively. If at step 279 the error term THTER2 is found to be less than a predetermined bound value, RPD, the program is terminated at step 280, since convergence will have been achieved.

If convergence is not detected at step 279, then in steps 281–284, the two initial values closest to VS3 from the set VS1, VS2, and VS3 are selected. These two values are used in the Newton- Raphson iteration formula at step 285 to compute an improved initial value estimate VS3. The outer loop counter is incremented at step 386 and flow returns from step 287 back to point 1 for a pass through the inner loop using the newly estimated value of cross-track velocity gradient. The outer loop iteration on cross-track velocity gradient continues either until convergence is detected at step 279 or until five iterations have been completed without achieving convergence, and the program is terminated at step 288. In the normal case where convergence is achieved, the values determined for the initial conditions on streamer tension, yaw angle $\theta$, and dip angle $\phi$ and for the cross-track velocity gradient determined in the last pass through the outer loop are the correct values for these quantities. The last integration performed in the last pass through the outer loop will have been performed using these quantities and accordingly, the values for the location quantities $x$, $y$, and $z$ determined in the integration define the location model for the streamer.

Once having obtained the solution model for that portion of the streamer between the stern of vessel 10 and the first depth controller, the procedure may be repeated to obtain a model for that portion of the streamer between the first and second depth controllers. The values for the parameters at the first depth controller obtained from the first model are used as boundary values for applying the Newton-Raphson technique to the portion of the streamer between the first and second depth controllers. After a model is developed for that portion of the streamer between the first and second depth controllers, it is used to provide boundary values at the second depth controller for that portion of the streamer between the second and third depth controllers. In this way, the solution proceeds down the streamer until the most remote section of the streamer is modeled.

Another method for generating a model of streamer position involves solving the differential equations as set forth hereinabove only for that portion of the streamer located between vessel 10 and the first depth controller. We have discovered that the position of the projection of the seismic streamer at the water surface at any instant may be well represented by a hyperbola. The $x,z$ coordinates of various sample points along that portion of the streamer between vessel 10 and the first depth controller are determined from the model provided by integrating the differential equations. A hyperbola is then determined which best fits these sample point locations in the least mean square error (LMSE) sense. The hyperbola may then be used as a model of streamer position both for that portion of the streamer between vessel 10 and the first depth controller, as well as for other portions of the streamer.

The general form of the hyperbola to be determined is given in equation (14) where the quantities $Z(I)$ and $X(I)$ are the known coordinates of the Ith sample point along that portion of the streamer between vessel 10 and the first depth controller.

$$[Z(I) + D]^2 = C(1)[X(I) + CC]^2 + C(2) \tag{14}$$

where:

$$I = 1, 2, \ldots, N.$$

The quantities $C(1)$ and $C(2)$ are parameters of the hyperbola which are to be determined. In addition to these two unknown quantities, it is also true that the origin of the hyperbola which best fits the data samples in the LMSE sense does not occur at the stern of vessel 10, that is at the origin of the $x,z$ coordinate system. As a result, it is necessary to also determine the value of D, the $z$ axis offset of the best fitting hyperbola and CC, the $x$ axis offset of the best fitting hyperbola. The quantities D and CC then, when properly determined, will define an origin vector which extends from the origin of the $x,y$ coordinate system to the origin of the best fitting hyperbola.

To begin the determination of this hyperbola, values are assumed for the quantities D and CC. At this point for simplificity equation (14) may be re-expressed as shown in equation (15).

$$ZZ(I) = C(1) \cdot XX(I) + C(2) \tag{15}$$

where:

$$ZZ(I) = [Z(I) + D]^2,$$

$$XX(I) = [X(I) + CC]^2.$$

The values of $C(1)$ and $C(2)$ which define the LMSE hyperbola for the known sample values are then determined in accordance with matrix equation (16).

$$\hat{C} = [F^T F] F^T Z \tag{16}$$

where: $\hat{C} = \begin{pmatrix} C(1) \\ C(2) \end{pmatrix}$;

$$F = \begin{bmatrix} XX(1) & 1 \\ XX(2) & 1 \\ \vdots & \vdots \\ XX(N) & 1 \end{bmatrix}; \quad Z = \begin{Bmatrix} ZZ(1) \\ ZZ(2) \\ \vdots \\ ZZ(N) \end{Bmatrix}$$

and, $F^T$ is the transpose of F.

Once having determined the values of these coefficients, equation (17) may be used to determine the mean square error (MSE) between the hyperbola and the known sampled values.

$$MSE = \frac{1}{N} \sum_{I=1}^{N} [ZZ(I) - C(1) \cdot XX(I) - C(2)]^2 \tag{17}$$

This hyperbola will be the true LMSE hyperbola, however, only if the origin vector for the hyperbola defined by the assumed values for D and CC is the true origin vector. This of course will rarely be the case. In order to seek a better origin vector, the values of D and CC are varied, and the procedure just described is repeated leading to a new mean square error as defined by equation (17). This iterative process is repeated until values for D and CC are found which lead to a mean square error which is less than a preselected upper bound or until a preselected number of iterations has been performed.

Considering this iterative process in greater detail, after the mean square error has been determined for the hyperbola having the first assumed origin vector, a new random sample for the origin vector is determined. The new origin vector has the same length as the originally assumed origin vector but has a random orientation. The LMSE hyperbola for this new origin vector is then determined, and its mean square error determined in accordance with equation (17). This generation of a new randomly oriented origin vector and subsequent determination of the corresponding mean square error is repeated until an origin vector is found which leads to a mean square error less than that resulting from previous origin vectors. The orientation of this new origin vector is assumed, for the moment, to be the correct orientation.

Now, using this new orientation, a golden section search routine is employed to determine the length of the origin vector which leads to the least mean square error for origin vectors having the new orientation. After determining this new length, the orientation of the vector is again allowed to vary in a random fashion in search of an origin vector with the new length which leads to an even lower mean square error. If some new orientation does indeed provide a lower mean square error, then the golden section search routine is again used to find the LMSE length for this new orientation. The procedure is continued alternating between varying the length and varying the orientation of the origin vector until an origin vector is found which results in a mean square error lower than a preselected upper bound. The hyperbola leading to this final mean square error is the model of the streamer position.

A set of FORTRAN instructions which performs the above-described procedure is included as Appendix B. In addition to the main program, this instruction set contains a function routine called FUNC. This routine determines the C coefficients of the LMSE hyperbola as defined by equation (16) and further determines the mean square error for the hyperbola as expressed in equation (17). The listing also includes subroutine EXPMN2 which inverts a 2 by 2 matrix as is required in equation (16). The instruction set further includes subroutine GSRCH which performs the golden section search routine used to determine the LMSE length for an origin vector with fixed orientation. Finally, the set includes a function routine called YMIN1 which is called by subroutine GSRCH to determine which of a set of four variables has the minimum value.

As set forth above, the procedure provides a hyperbola which accurately represents the location of that portion of the streamer for which integration of the equilibrium differential equations has produced sample locations. Since the location of the more remote portions of the streamer is strongly influenced by the location of that portion of the streamer between vessel 10 and the first depth controller, the hyperbola also serves to accurately represent the location of the remote portions of the streamer.

Whereas there has been disclosed the preferred embodiment of the invention along with several variations, there may be suggested to those skilled in the art other embodiments which do not depart from the spirit and scope of the invention as set forth in the following claims.

TABLE I

| | |
|---|---|
| VSLOPE | Cross-track velocity gradient with depth |
| W(1) | Differential equation variable, x-position |
| W(2) | y-position |
| W(3) | z-position |
| W(4) | Tension |
| W(5) | Yaw angle |
| W(6) | Pitch angle |
| IIT | Inner loop iteration counter |
| JJ | Loop control on first 5 integrations |
| YINIT | Initial value of depth from measurement |
| TEE1 | First initial value of tension |
| TEE2 | 2nd initial value of tension |
| THETA 1 | First initial value of yaw |
| THETA 2 | 2nd initial value of Yaw |
| PHI 1 | First initial value of pitch |
| PHI 2 | 2nd initial value of pitch |
| Y | Position variable |
| T | Tension variable |
| PHI | Pitch variable |

| | |
|---|---|
| XLMDA(I, J) | Error term computed from final value minus boundary value |
| YBAR | Boundary value on depth |
| TBAR | Boundary value on tension |
| PHIBAR | Boundary value on pitch |
| SAVE16 | Iterative value for XLMDA (1,5) |
| SAVE26 | Iterative value for XLMDA (2,5) |
| SAVE36 | Iterative value for XLMDA (3,5) |
| DTEE | reciprocal of delta tension between first and second initial tension values |
| DTHETA | Reciprocal of delta yaw between first and second initial yaw values |
| DPHI | Reciprocal of delt pitch between first and second initial pitch values |
| A(I,J) | Matrix of estimated partial derivatives used in Newton-Raphson convergence method, and later its inverse |
| VLMDA(I) | Present value of error terms: i.e., XLMDA(I,5) |
| VINCR(I) | Increment in initial values of tension, yaw and pitch for I= 1,2,3 |
| TEST1 | Temporary test variable |
| TEST2 | Temporary test variable |
| TEE3 | Computed value for initial value of tension by the Newton-Raphson method |
| THETA3 | Computed value for initial value of yaw by the Newton-Raphsen method |
| PHI3 | computed value for initial value of pitch by the Newton-Raphson method |
| TMIN | An arbitrary minimum value for the difference between two tension values (initial) |
| THTMIN | An arbitrary minimum value for the difference between two yaw values (initial) |

| | |
|---|---|
| PHIMIN | An arbitrary minimum value for the difference between two pitch values (initial) |
| NITER | An iteration counter for the inner Newton-Raphson loop (IIT) |
| IFAG | An ineration counter for the outer Newton-Raphson loop |
| THTER1 | Error term for yaw after first pass through outer Newton-Raphson loop |
| THTER2 | Error term for yaw after second pass through outer Newton-Raphson loop |
| THTBAR | Boundary value for yaw |
| VS2, Vs1 | Initial values for VSLOPE |
| VS3 | Computed value for VSLOPE by Newton-Raphson method |
| NOTE: | INTEGRATE refers to the integration of the cable differential equations using the subrouting RKAM, described elsewhere |
| DERRUN | A subrouting in which the derivatives pertinent to the solution of the cable differential equations are evaluated |
| EPSLN1 | Convergence limit on Y |
| EPSLN2 | Convergence limit on T |
| EPSLN3 | Convergence limit on PHI |

APPENDIX A

```
      IMPLICIT REAL*8(A-H,O-Z)
      DIMENSIONW(20),A(20),D(20),B(20)
      COMMON/CASE/VSUBX,VSUBY,VSUBZ,DUBLU,RDCN,RDCF,RHO,DEE,CSUBF,CSUBN,
     1VSLOPE
      READ 44,NPROB,NPINTV,NITER     CARD 1
      FORMAT(8I10)
      READ 10,INIMSH,MAXMSH,MINMSH,SSEMAX,SSEMIN,REDFCT     CARD 2
      INIMSH IS THE INITIAL VALUE OF THE MESH SIZE
      MAXMSH IS THE MAXIMUM ABSOLUTE VALUE FOR THE MESH SIZE
      MINMSH IS THE MINIMUM ABSOLUTE VALUE FOR THE MESH SIZE
      SSEMAX IS THE MAX ABS. VALUE OF THE ALLOWABLE SINGLE STEP ERROR
      SSEMIN IS THE MIN ABS. VALUE OF THE ALLOWABLE SINGLE STEP ERROR
      REDFCT IS THE REDUCTION FACTOR TO BE USED IF THE STEP SIZE MUST BE
     REDUCED
      DO 43 IDO = 1,NPRCB
```

```
      READ 10,ALPHA,OMEGA,PHI1,PHI2,THETA1,THETA2,TEE1,TEE2         CARD3
      FORMAT(8F10.0)
      PI = 4.D0*DATAN(1.D0)
      RPD = PI/180.D0
      READ 10,RHO,DEE,CSUBF,CSUBN,VSUBX,VSUBY,VSUBZ,DUBLU           CARD 4
      READ 10,YBAR,TBAR,THTBAR,PHIBAR,EPSLN1,EPSLN2,EPSLN3          CARD 5
      READ 10,(A(I),D(I),B(I),I=1,NPINTV)            CARD 6
      PRINT 60
      FORMAT(1H1,47X,38HCONTROL PARAMETERS AND STARTING VALUES//)
      PRINT 70, INIMSH,MAXMSH,MINMSH,SSEMAX,SSEMIN,REDFCT
      FORMAT(31X,30HINITIAL VALUE OF THE MESH SIZE,31X,F10.5,//31X,40HMA
     1XIMUM ABSOLUTE VALUE FOR THE MESH SIZE,21X,F10.5,//31X,40HMINIMUM
     2ABSOLUTE VALUE FOR THE MESH SIZE,21X,F10.5,//31X,57HMAXIMUM ABSOLU
     3TE VALUE OF THE ALLOWABLE SINGLE STEP ERROR,4X,F10.5,//31X,57HMINI
     4MUM ABSOLUTE VALUE OF THE ALLOWABLE SINGLE STEP ERROR,4X,F10.5,//3
     51X,56HREDUCTION FACTOR TO BE USED IF STEP SIZE MUST BE REDUCED,5X,
     6F10.5//)
      PRINT 72,ALPHA,OMEGA,RHO,DEE,CSUBF,CSUBN,VSUBX,VSUBY,VSUBZ,DUBLU,
     1      YBAR,TBAR,THTBAR,PHIBAR,EPSLN1,EPSLN2,EPSLN3
      FORMAT(56X,9HALPHA    ,F10.5,
     1/56X,9HOMEGA    ,F10.5,
     2/56X,9HRHO      ,F10.5,
     3/56X,9HD        ,F10.5,
     4/56X,9HCSUBF    ,F10.5,
     5/56X,9HCSUBN    ,F10.5,
     6/56X,9HVSUBX    ,F10.5,
     7/56X,9HVSUBY    ,F10.5,
     8/56X,9HVSUBZ    ,F10.5,
     9/56X,9HW        ,F10.5,
     D/56X,'YBAR     ',F10.5
     E/56X,'TBAR     ',F10.5,
     Z/56X,9HTHTBAR   ,F10.5,
     Z/56X,9HPHIBAR   ,F10.5,
     F/56X,9HEPSLN1   ,F10.5,
     F/56X,9HEPSLN2   ,F10.5,
     F/56X,9HEPSLN3   ,F10.5)
      PHI1 =PHI1*RPD
      PHI2=PHI2*RPD
      THETA1 = THETA1*RPD
      THETA2 = THETA2*RPD
      THTBAR = THTBAR*RPD
      PHIBAR = PHIBAR*RPD
      CALL CABL4     (W,ALPHA,OMEGA,SSEMAX,SSEMIN,INIMSH,MAXMSH,MINMSH,
     1REDFCT,A,D,B,NPINTV,THETA1,THETA2,PHI1,PHI2,YBAR,TBAR,NITER,TSUBX,
     2THTBAR,TEE1,TEE2,EPSLN1,EPSLN2,EPSLN3,PHIBAR)
      CONTINUE
      STOP
      END
      SUBROUTINE CABL4(W,ALPHA,OMEGA,SSEMAX,SSEMIN,INIMSH,MAXMSH,MINMSH,
     1REDFCT,A,D,B,NPINTV,THETA1,THETA2,PHI1,PHI2,YBAR,TBAR,NITER,TSUBX,
     2THTBAR,TEE1,TEE2,EPSLN1,EPSLN2,EPSLN3,PHIBAR)
      IMPLICIT REAL*8(A-H,O-Z)
      REAL*4 INIMSH,MAXMSH,MINMSH
      DIMENSION W(1),AA(3,3),VLMDA(3),VINCR(3),XLMDA(3,5)
      DIMENSION BB(3,3),C(3,3)
      COMMON/CASE/VSUBX,VSUBY,VSUBZ,DUBLU,RDCN,RDCF,RHO,DEE,CSUBF,CSUBN,
     1VSLOPE
      VS1 = -.002D0
      VS2 =  .002D0
      VSLOPE = VS1
      IFLAG = -1
      RPD = .001
```

```
      CONTINUE
      DO 500 IIT=1,NITER
      YINIT = -50.
      DO 510 JJ=1,5
      PRINT 75,IIT,JJ
      FORMAT(1H1,45X,14HMAIN ITERATION,I3,5X,13HSUB ITERATION,I3)
      W(1)=0.0
      W(2)=YINIT
      W(3)=0.0
      GO TO (505,506,507,508,509),JJ
      IF(IIT.GT.1) GO TO 5055
      W(4) = TEE1
      W(5) = THETA1
      W(6) = PHI1
      CALL RKAM(W,ALPHA,OMEGA,SSEMAX,SSEMIN,INIMSH,MAXMSH,MINMSH,REDFCT,
     1A,D,B,NPINTV)
      XLMDA(1,1) = W(2)-YBAR
      XLMDA(2,1) = W(4)-TBAR
      XLMDA( 3,1)= W(6)-PHIBAR
      GO TO 510
      XLMDA(1,1) = SAVE15
      XLMDA(2,1) = SAVE25
      XLMDA(3,1) = SAVE35
      GO TO 510
      W(6) = PHI1
      W(5) = THETA1
      W(4) = TEE2
      CALL RKAM(W,ALPHA,OMEGA,SSEMAX,SSEMIN,INIMSH,MAXMSH,MINMSH,REDFCT,
     1A,D,B,NPINTV)
      XLMDA(1,2) = W(2)-YBAR
      XLMDA(2,2) = W(4)-TBAR
      XLMDA(3,2) = W(6)-PHIBAR
      GO TO 510
      W(6) = PHI1
      W(5) = THETA2
      W(4) = TEE1
      CALL RKAM(W,ALPHA,OMEGA,SSEMAX,SSEMIN,INIMSH,MAXMSH,MINMSH,REDFCT,
     1A,D,B,NPINTV)
      XLMDA(1,3) = W(2)-YBAR
      XLMDA(2,3) = W(4)-TBAR
      XLMDA(3,3) = W(6)-PHIBAR
      GO TO 510
      W(6) = PHI2
      W(5) = THETA1
      W(4) = TEE1
      CALL RKAM(W,ALPHA,OMEGA,SSEMAX,SSEMIN,INIMSH,MAXMSH,MINMSH,REDFCT,
     1A,D,B,NPINTV)
      XLMDA(1,4) = W(2)-YBAR
      XLMDA(2,4) = W(4)-TBAR
      XLMDA(3,4) = W(6)-PHIBAR
      GO TO 510
      IF(IIT.GT.1) GO TO 5095
      W(6) = PHI2
      W(4) = TEE2
      W(5) = THETA2
      CALL RKAM(W,ALPHA,OMEGA,SSEMAX,SSEMIN,INIMSH,MAXMSH,MINMSH,REDFCT,
     1A,D,B,NPINTV)
      XLMDA(1,5) = W(2)-YBAR
      XLMDA(2,5) = W(4)-TBAR
      XLMDA(3,5) = W(6)-PHIBAR
      SAVE15 = XLMDA(1,5)
      SAVE25 = XLMDA(2,5)
      SAVE35 = XLMDA(3,5)
```

```
      GO TO 510
      XLMDA(1,5) = SAVE16
      XLMDA(2,5) = SAVE26
      XLMDA(3,5) = SAVE36
      SAVE15=SAVE16
      SAVE25=SAVE26
      SAVE35=SAVE36
      CONTINUE                  END OF JJ LOOP.
C     THE 3X3 MATRIX "A" IS THE MATRIX OF ESTIMATES OF THE PARTIAL
C     DERIVATIVES
C     NOTE: THE ERROR VECTOR AFTER THE J-TH INTEGRATION IS DEFINED:
C     XLMDA(I,J) = (W(2)-YBAR),(W(4)-TBAR),(W(6)-PHIBAR),I=1,5
C     THE INVERSION OF "A" IS PERFORMED BY EXPANSION BY MINORS.

DTEE = 1.D0/(TEE2-TEE1)
      DTHETA=1.D0/(THETA2-THETA1)
      DPHI = 1.D0/(PHI2-PHI1)
      AA(1,1) = (XLMDA(1,2)-XLMDA(1,1))*DTEE
      AA(1,2) = (XLMDA(1,3)-XLMDA(1,1))*DTHETA
      AA(1,3) = (XLMDA(1,4)-XLMDA(1,1))*DPHI
      AA(2,1) = (XLMDA(2,2)-XLMDA(2,1))*DTEE
       AA(2,2) = (XLMDA(2,3)-XLMDA(2,1))*DTHETA
      AA(2,3) = (XLMDA(2,4)-XLMDA(2,1))*DPHI
      AA(3,1) = (XLMDA(3,2)-XLMDA(3,1))*DTEE
      AA(3,2) = (XLMDA(3,3)-XLMDA(3,1))*DTHETA
      AA(3,3) = (XLMDA(3,4)-XLMDA(3,1))*DPHI
      VLMDA(1) = XLMDA(1,5)
      VLMDA(2) = XLMDA(2,5)
      VLMDA(3) = XLMDA(3,5)
      WRITE(6,9999) TEE1,TEE2,THETA1,THETA2,PHI1,PHI2
 9999 FORMAT(1H1,' TEE''S',2D15.6,' THETA''S',2D15.6,' PHI''S',2D15.6)
      WRITE(6,8879)
 8879 FORMAT(/' THE W''S')
      WRITE(6,8880) (W(IL),IL=1,6)
 8880 FORMAT(8F13.5)
      WRITE(6,7690)
 7690 FORMAT( /,' THE XLMDA''S')
      WRITE(6,7700)((XLMDA(IL,JL),IL=1,3),JL=1,5)
 7700 FORMAT(1X,3D15.6)
      WRITE(6,7691)
 7691 FORMAT(//)
      WRITE(6,7701) DTEE,DTHETA,DPHI
 7701 FORMAT(' DTEE =',D15.6,' DTHETA =',D15.6,' DPHI =',D15.6)
      WRITE(6,7691)
      PRINT 7692
 7692 FORMAT(' THE VLMDA''S')
      WRITE(6,7700) (VLMDA(IL),IL=1,3)
      WRITE(6,7691)
      WRITE(6,7693)
 7693 FORMAT(/' THE A''S')
      WRITE(6,7700) ((AA(IL,JL),JL=1,3),IL=1,3)
      WRITE(6,7691)
      DO 7795 IL=1,3
      DO 7795 JL=1,3
 7795 BB(IL,JL) = AA(IL,JL)
      CALL EXPMIN(AA,DET)
      IF(DET) 10,11,10
   10 CONTINUE
      WRITE(6,7693)
      WRITE(6,7696) DET
 7696 FORMAT(' DETERMINANT =',D15.6)
      WRITE(6,7700) ((AA(IL,JL),JL=1,3),IL=1,3)
      WRITE(6,7691)
```

```
      DO 7796 IL=1,3
      DO 7796 JL=1,3
      C(IL,JL) = 0.D0
      DO 7796 KL=1,3
      C(IL,JL) = C(IL,JL)+AA(IL,KL)*BB(KL,JL)
      CONTINUE
      WRITE(6,7693)
      WRITE(6,7700) ((C(IL,JL),JL=1,3),IL=1,3)
      VINCR(1) = AA(1,1)*VLMDA(1)+AA(1,2)*VLMDA(2)+AA(1,3)*VLMDA(3)
      VINCR(2) = AA(2,1)*VLMDA(1)+AA(2,2)*VLMDA(2)+AA(2,3)*VLMDA(3)
      VINCR(3) = AA(3,1)*VLMDA(1)+AA(3,2)*VLMDA(2)+AA(3,3)*VLMDA(3)
      WRITE(6,7694)
      FORMAT(/' THE VINCR''S')
      WRITE(6,7700) (VINCR(IL),IL=1,3)
      TEE3 = TEE2-VINCR(1)
      THETA3=THETA2 -VINCR(2)
      PHI3 = PHI2-VINCR(3)
      W(4) = TEE3
      W(5) = THETA3
      W(6) = PHI3
      W(1) = 0.D0
      W(2) = YINIT
      W(3) = 0.D0
      WRITE(6,8879)
      WRITE(6,8880) (W(IL),IL=1,6)
      PRINT 515,IIT
      FORMAT(1H1,47X,31HFINAL VALUES FOR MAIN ITERATION,I3)
      CALL RKAM(W,ALPHA,OMEGA,SSEMAX,SSEMIN,INIMSH,MAXMSH,MINMSH,REDFCT,
     1A,D,B,NPINTV)
      SAVE16=W(2)-YBAR
      SAVE26 = W(4)-TBAR
      SAVE36 = W(6) -PHIBAR
      IF(DABS(W(2)-YBAR)-EPSLN1) 511,511,513
      IF(DABS(W(4)-TBAR)-EPSLN2) 512,512,513
      IF(DABS(W(6)-PHIBAR)-EPSLN3) 600,600,513
      CONTINUE
      TEST1 = DABS(TEE1-TEE3)
      TEST2 = DABS(TEE2-TEE3)
      IF(TEST1-TEST2) 9001,9001,9000
      TEE1=TEE2
      TEE2=TEE3
      TMIN = 1.D-6*TEE2
      TEST1= DABS(THETA1-THETA3)
      TEST2 = DABS(THETA2-THETA3)
      IF(TEST1-TEST2) 9003,9003,9002
      THETA1=THETA2
      THETA2 = THETA3
      THTMIN = 1.D-6*THETA2
      TEST1 = DABS(PHI1-PHI3)
      TEST2 = DABS(PHI2-PHI3)
      IF(TEST1-TEST2) 9005,9005,9004
      PHI1=PHI2
      PHI2=PHI3
      PHIMIN = 1.D-6*PHI2
      IF(DABS(TEE1-TEE2).LT.TMIN) TEE2=TEE2+TMIN
      IF(DABS(PHI1-PHI2).LT.PHIMIN) PHI2=PHI2+PHIMIN
      IF(DABS(THETA1-THETA2).LT.THTMIN) THETA2=THETA2+THTMIN
      WRITE(6,7695)
      FORMAT(1H1)
      WRITE(6,9999) TEE1,TEE2,THETA1,THETA2,PHI1,PHI2
      CONTINUE                    END OF IIT LOOP.
      PRINT8505
      FORMAT(42X,50HPROGRAM TERMINATED WITHOUT MEETING FINAL CONDITION)
```

```
      GO TO 700
      WRITE(6,9) IIT,JJ,DET
    9 FORMAT(' ON ITERATION',I2,' SUB-ITERATION',I2,' THE DETERMINANT WA
     1S',E15.6)
      GO TO 700
      PRINT 605,IIT
  605 FORMAT(46X,40HFINAL CONDITION MET ON ITERATION NUMBER ,I2)
      TSUBX = W(4) *DCOS(W(6)) *DCOS(W(5))
      TSUBY = W(4) *DSIN(W(6))
      TSUBZ = W(4) *DCOS(W(6)) *DSIN(W(5))
      PRINT 610,TSUBX,TSUBY,TSUBZ
  610 FORMAT(//58X,6HTSUBX=,F15.8,/58X,6HTSUBY=,F15.8,/58X,6HTSUBZ=,
     1 F15.8)
      CONTINUE
      IF(IFLAG)2,3,4
      IF(IFLAG-5) 5,5,700
      VSLOPE = VS2
      THTER1 = W(5)-THTBAR
      IFLAG = IFLAG+1
      GO TO 1
      THTER2 = W(5)-THTBAR
      VS3 = (THTER1*VS2-THTER2*VS1)/(THTER1-THTER2)
      PRINT 1946
 1946 FORMAT(//,' *********************************************')
 1945 FORMAT(//,' THTER1=',D15.6,' THTER2=',D15.6,' VS1=',D15.6,
     1' VS2=',D15.6,' VS3=',D15.6)
      PRINT 1945,THTER1,THTER2,VS1,VS2,VS3
      PRINT 1946
      VSLOPE = VS3
      IFLAG = IFLAG+1
      GO TO 1
      THTER1 = THTER2
      THTER2 = W(5)-THTBAR
      IF(DABS(THTER2)-RPD ) 700,700,701
  701 TEST1 = DABS(VS1-VS3)
      TEST2 = DABS(VS2-VS3)
      IF(TEST1-TEST2) 19001,19001,19000
      VS1=VS2
      VS2=VS3
      VS3=(THTER1*VS2-THTER2*VS1)/(THTER1-THTER2)
      VSLOPE = VS3
      PRINT 1945,THTER1,THTER2,VS1,VS2,VS3
      IFLAG = IFLAG+1
      GO TO 1
      CONTINUE
      RETURN
      END
      SUBROUTINE EXPMIN(A,DET)
      IMPLICIT REAL*8(A-H,O-Z)
      DIMENSION A(3,3), C(3,3)
      C(1,1) = A(2,2)*A(3,3)-A(2,3)*A(3,2)
      C(1,2) = A(2,1)*A(3,3)-A(2,3)*A(3,1)
      C(1,3) = A(2,1)*A(3,2)-A(2,2)*A(3,1)

C(2,1) = A(1,2)*A(3,3)-A(1,3)*A(3,2)
      C(2,2) = A(1,1)*A(3,3)-A(1,3)*A(3,1)
      C(2,3) = A(1,1)*A(3,2)-A(1,2)*A(3,1)

C(3,1) = A(1,2)*A(2,3)-A(1,3)*A(2,2)
      C(3,2) = A(1,1)*A(2,3)-A(1,3)*A(2,1)
      C(3,3) = A(1,1)*A(2,2)-A(1,2)*A(2,1)
```

```
      DET = A(1,1)*C(1,1)-A(1,2)*C(1,2)+A(1,3)*C(1,3)
      IF (DET) 1,2,1
      DET = 1.D0/DET
      DO 10 I=1,3
      DO 10 J=1,3
      A(I,J) = C(J,I)*DET*(-1.D0)**(I+J)
      CONTINUE
      RETURN
      END
      SUBROUTINE RKAM(W,ALPHA,OMEGA,F1MAX,E1MIN,E2INI,E2MAX,E2MIN,FACT,A
     1,D,B,M5)
      IMPLICIT REAL*8(A-H,O-Z)
      DIMENSION DELW(4,100),BET(4),XV(5),FV(5,100),WU(5,100),W(1),A(1),D
     1(1),B(1),T(20)
      EQUIVALENCE (M1,NN),(MODE,M2),(KKA,M3)
      DATA BET/.5D0,.5D0,1.D0,0.D0/
      DO 5 I=1,M5
      T(I)=A(I)
      M1=6
      M2=3
      M3=1
      M4 = 2
      LL=1
      KM=1
      W(M1+1)=ALPHA
      LT=2
      W(I)=WU(MM,I)
      W(NP1)=XV(MM)
      CALL DERFUN (W)
      GO TO  (42,100,100),MODE
      DO 150 I=1,NN
      FV(MM,I)=W(I+N2)
      GO TO (1001,1001,1001,2000,2000),MM
*>    ADAMS-MOULTON METHOD  ****
      DO 2048 I=1,NN
      DEL=W(N2)*(55.D0*FV(4,I)-59.D0*FV(3,I)+37.D0*FV(2,I)-9.D0*FV(1,I))
     1/24.D0
      W(I)=WU(4,I)+DEL
      DELW(1,I)=W(I)
      W(NP1)=XV(4)+W(N2)
      CALL DERFUN (W)
      XV(5)=W(NP1)
      DO 2051 I=1,NN
      DEL=W(N2)*(9.D0*W(I+N2)+19.D0*FV(4,I)-5.D0*FV(3,I)+FV(2,I))/24.D0
      WU(5,I)=WU(4,I)+DEL
      W(I)=WU(5,I)
      CALL DERFUN (W)
      GO TO (42,42,3000),MODE
**    ERROR ANALYSIS ****
      SSE=0.0
      DO 3033 I=1,NN
      EPSIL=R*DABS(W(I)-DELW(1,I))
      GO TO (3301,3307),KKA
      IF(W(I)) 3650,3307,3650
      EPSIL=EPSIL/DABS(W(I))
      IF(SSE-EPSIL) 3032,3033,3033
      SSE=EPSIL
      CONTINUE
      IF(E1MAX-SSE) 3034,3034,3035
      IF(DABS(W(N2))-E2MIN) 42,42,4340
      IF(SSE-E1MIN) 3036,42,42
      IF(E2MAX-DABS(W(N2))) 42,42,5360
```

```
      LL=1
      MM=1
      GO TO (4560,4660),M4
      PRINT 799
      FORMAT( 16X,96H***************************************************
     1***********************************)
      PRINT 800,SSE,W(NP1),W(N2)
      FORMAT( 23X,18H MAXIMUM ERROR OF E17.10,4H AT E15.6,19H WITH STEP
     1SIZE OF E15.8 )
      W(N2)=W(N2)*FACT
      PRINT 820,XV(1),W(N2)
      FORMAT(30X,27H ERROR TOO LARGE. BEGIN AT E15.6,19H WITH STEP SIZE
     1OF E15.8)
      PRINT 799
      GO TO 1001
      W(N2)=W(N2)*FACT
      GO TO 1001
      GO TO (42,5361),LL
      XV(2)=XV(3)
      XV(3)=XV(5)
      DO 5363 I=1,NN
      FV(2,I)=FV(3,I)
      FV(3,I)=W(I+N2)
      WU(2,I)=WU(3,I)
      WU(3,I) = WU(5,I)
      LL=2
      MM=3
      GO TO (5270,5370),M4
      PRINT 799
      PRINT 800,SSE,W(NP1),W(N2)
      W(N2)=2.0D0*W(N2)
      PRINT 840,W(N2)
      FORMAT( 43X,32H ERROR TOO SMALL. NEW STEP SIZE E15.8 )
      PRINT 799
      GO TO 1001
      W(N2)=2.0D0*W(N2)
      GO TO 1001
   **   EXIT ROUTINE    ****
      DO 322 I=1,NN
      FV(5,I)=W(I+N2)
      GO TO (701,602),LT
      DO 12 K=1,3
      XV(K)=XV(K+1)
      DO 12 I=1,NN
      FV(K,I)=FV(K+1,I)
      WU(K,I)=WU(K+1,I)
      LL=2
      MM=4
      XV(4)=XV(5)
      DO 52 I=1,NN
      FV(4,I)=FV(5,I)
      WU(4,I)=WU(5,I)
      GO TO (1001,2000,2000),MODE
   ** PRINTOUT WITH SPECIFICATIONS   ****
      TZ=DABS(W(N2))*ZCT
      GO TO (700,750,750),MODE
      KT=4
      GO TO 430
      KT=1
      SPACE=T(KM)-XV(KT)
      Z=DABS(SPACE)
      IF(Z-TZ) 437,437,436
      IF(SPACE) 413,403,413
```

```
      DO 404 I=1,NN
      W(I)=WU(KT,I)
      GO TO 443
      KT=KT+1
      GO TO (430,430,430,430,430,790),KT
      DO 438 I=1,NN
      W(I+N2)=FV(KT,I)
      DO 439 K=1,4
      DO 440 I=1,NN
      DELW(K,I)=SPACE*W(I+N2)
      Z=WU(KT,I)
      W(I)=Z+BET(K)*DELW(K,I)
      W(NP1)=BET(K)*SPACE+XV(KT)
      CALL DERFUN (W)
      DO 442 I=1,NN
      W(I)=WU(KT,I)+(DELW(1,I)+2.D0*DELW(2,I)+2.D0*DELW(3,I)+DELW(4,I))
     1/6.D0
      THDEG=W(5)*57.29577950D0
      PRINT 36,T(KM),(W(I),I=1,4),THDEG,PHDEG
      IF(M5) 120,120,119
      LT=1
      CONTINUE
**    SET CONSTANTS  ****
      GO TO (7,88,88),M2
      MM=4
      J1=4
      GO TO 9
      MM=1
      J1=1
      EPM=2.D0*DABS(OMEGA-ALPHA)
      E3=EPM
      ZOT=.5D0+2.D0**(-32)
      N2=NN+2
      W(N2)=E2INI
      NP1=NN+1
      R = 19.D0/270.D0
      XV(MM)=W(NP1)
      IF(E1MIN) 2,2,1
      E1MIN=E1MAX/55.0D0
      IF(FACT) 4,4,3
      FACT = .5D0
      CALL DERFUN (W)
      DO 320 I=1,NN
      FV(MM,I)=W(I+N2)
      WU(MM,I)=W(I)
      N3=N2+NN+1
      N4=N3+1
      GO TO (501,502),LT
      E3=DABS(T(1)-B(1))
      IF(D(1)) 505,504,505
      E3=DABS(W(N2)/2.0D0)
      ABM=E3
      PRINT 400,KM
      FORMAT   (50X,31HBEGINNING OF PRINTING INTERVAL ,I2,
     1  //16X,8HDISTANCE,/17X,5HALONG,13X,1HX,14X,1HY,14X,1HZ,11X,5HCAB
     2LE,11X,5HANGLE,10X,5HANGLE,/17X,5HCABLE,8X,10HCOORDINATE,5X,10HCOO
     3RDINATE,5X,10HCCCRDINATE,6X,7HTENSION,10X,5HTHETA,11X,3HPHI//)
      GO TO 1001
      PRINT 37
      FORMAT( 40X,28H PRINTING AT EACH MESH POINT//)
**    RUNGE-KUTTA METHOD  ****
      DO 1034 K=1,4
      DO 1350 I=1,NN
```

```
DELW(K,I) = W(N2)*FV(MM,I)
Z=WU(MM,I)
W(I) = Z+BET(K)*DELW(K,I)
W(NP1)=BET(K)*W(N2)+XV(MM)
CALL DERFUN  (W)
DO 1100 I=1,NN
FV(MM,I)=W(I+N2)
CONTINUE
DO 1039 I=1,NN
DEL = (DELW(1,I)+2.D0*DELW(2,I)+2.D0*DELW(3,I)+DELW(4,I))/6.D0
WU(MM+1,I)=WU(MM,I)+DEL
CONTINUE
MM=MM+1
XV(MM)=XV(MM-1)+W(N2)
DO 1400 I=1,NN
PHDEG=W(6)*57.2957795D0
FORMAT(15X,F10.4,6(3X,F12.5))
IF(NN.NE.6) GO TO 8000
IF(D(KM)) 715,746,715
T(KM)=T(KM)+D(KM)
E=DABS(T(KM)-B(KM))
IF(E-ABM) 744,746,746
ABM=E
GO TO 430
KM=KM+1
IF(KM-M5) 702,702,648
CONTINUE
PRINT 400,KM,T(KM),D(KM),B(KM)
E3=DABS(T(KM)-B(KM))
IF(D(KM)) 714,713,714
E3=DABS(W(N2)/2.0D0)
ABM=E3
GO TO (700,750,750),MODE
E=DABS(XV(J1)-OMEGA)
IF(E-EPM) 706,648,648
EPM=E
GO TO 142
**  PRINTOUT AT EACH MESH POINT  ****
E=DABS(OMEGA-XV(J1))
IF(E-EPM) 672,672,648
EPM=E
GO TO (600,650,650),MODE
KT=4
GO TO 630
KT=1
E=DABS(OMEGA-XV(KT))
IF(E-E3) 647,645,645
E3=E
DO 666 I=1,NN
W(I)=WU(KT,I)
THDEG=W(5)*57.2957795D0
PHDEG=W(6)*57.2957795D0
PRINT 36, XV(KT),(W(I),I=1,4),THDEG,PHDEG
KT=KT+1
GO TO (630,630,630,630,630,142),KT
PRINT 8001,NN
FORMAT(5X,23HNN NOT EQUAL TO 6  NN =,I2)
RETURN
END
SUBROUTINE DERFUN (W)
IMPLICIT REAL*8(A-H,O-Z)
DIMENSION W(1)
COMMON/CASE/VSUBX,VSUBY,VSUBZ,DUBLU,RDCN,RDCF,RHO,DEE,CSUBF,CSUBN,
```

```
1VSLOPE
 VSUBZ = VSLOPE*W(2)
 RDCF =  -(RHO * DEE * CSUBF) / 2.0D0
 RDCN =  -(RHO * DEE * CSUBN) / 2.0D0
 SINTH=DSIN(W(5))
 SINPH=DSIN(W(6))
 COSTH=DCOS(W(5))
 COSPH=DCOS(W(6))
 IF(DABS(COSPH).LT..000001D0) COSPH=    -.000002D0
 W(9)=COSTH COSPH
 W(10)=SINPH
 W(11)=SINTH*COSPH
 C1=VSUBX*W(9)+VSUBY*SINPH+VSUBZ*W(11)
 C2=DABS(C1)
 W(12)=(RDCF*C1*C2)+DUBLU*SINPH
 C3=RDCN/(W(4)*COSPH)
 C4=-VSUBX*SINTH+VSUBZ*COSTH
 C5=-VSUBX*COSTH*SINPH+VSUBY*COSPH-VSUBZ*SINTH*SINPH
 W(13)=C3*C4*DSQRT(C4*C4+C5*C5)
 C6=RDCN/W(4)
 W(14)=C6*C5*DSQRT(C4*C4+C5*C5)+(DUBLU*COSPH)/W(4)
 RETURN
 END
```

APPENDIX B

```
 IMPLICIT REAL*8(A-H,O-Z)
 REAL*8 MNLIM,LMSERR
 DIMENSION U(2),USAV(2),RG(2),X(26),Z(26),C(2),ZZ(26),XX(26)
 COMMON CC,D,X,Z,C,U,NN
 NN = 26
 FORMAT(4D20.13)
 READ X'S AND Z'S
 READ 100,(XX(I),I=1,NN)
 READ 100,(ZZ(I),I=1,NN)
 XCON = XX(NN)
 ZCON = ZZ(NN)
 DO 123 I=1,NN
 II = NN-I+1
 Z(I) = ZCON-ZZ(II)
 X(I) = XCON-XX(II)
 PRINT 125,X(I),Z(I)
 IA = 1233
 ICNT = 0
 MNLIM = 26.D0
 MNLIM = 1.D-4
 TOP = 10.D0
 TOP = 100.D0
 BOTTOM = 1.D-4
 XU = TOP
 XUSAV = XU
 ACC = 1.D-4
 ITLIM = 20
 TSTSAV = 1.D30
 SCHTST= TSTSAV
 USAV(1) = 1.D0/DSQRT(2.D0)
 USAV(2) = USAV(1)
 CONTINUE
 ICNT = ICNT+1
 PRINT 8888,ICNT
 FORMAT(1H1,' ITERATION NUMBER',I5)
 U(1) = USAV(1)
 U(2) = USAV(2)
```

```
      IF(ICNT-1) 12,12,25
   12 CONTINUE
      PRINT 780
  780 FORMAT(' NO. 25')
      DO 10 I=1,ITLIM
      U(1) = USAV(1)+RG(1)
      CALL NDRN(IA,RG,2)
      U(2) = USAV(2)+RG(2)
      UNORM = 1.D0/DSQRT(U(1)**2+U(2)**2)
      U(1) = DABS(U(1)*UNORM)
      U(2) = DABS(U(2)*UNORM)
      LMSERR = FUNC(XUSAV)
      IF(LMSERR-MNLIM) 14,14,11
   11 IF(LMSERR-TSTSAV) 26,10,10
   10 CONTINUE
      U(1) = USAV(1)
      U(2) = USAV(2)
      IF(TSTSAV-SCHTST) 12,144,144
  144 CONTINUE
      PRINT 778,ICNT
  778 FORMAT(' NO. 144',I2)
      IF(ICNT-ITLIM) 24,24,14
   26 CONTINUE
      TSTSAV = LMSERR
      USAV(1) = U(1)
      USAV(2) = U(2)
      PRINT 777,TSTSAV,SCHTST,(USAV(I),I=1,2)
  777 FORMAT(' NO. 26, TSTSAV =',D15.6,' SCHTST =',D15.6,'
     1      USAV',2D15.6)
      GO TO 25
   24 CONTINUE
      XU = XUSAV
      CALL GRSRCH(BOTTOM,TOP,ACC,XU,LMSERR)
      IF(LMSERR-TSTSAV) 244,24,24
  244 CONTINUE
      PRINT 796
  796 FORMAT(' NO. 796')
      XUSAV = XU
      TSTSAV = LMSERR
      SCHTST = TSTSAV
      IF(LMSERR-MNLIM) 14,14,24
   14 U(1) = USAV(1)
      U(2) = USAV(2)
      TSTSAV = FUNC(XUSAV)
      PRINT 101,CC,D,(C(I),I=1,2),TSTSAV,ICNT
  101 FORMAT(' C =',D15.6,' D =',D15.6,' COEFF''S: ',2D15.6,
     1' LMSERR =',D15.6,' ICNT =',I5)
      DO 124 I=1,NN
      XSQ = (X(I) +CC)**2
  124 Z(I) = DSQRT(C(1)*XSQ+C(2))-D
      PRINT 125,X(I),Z(I)
  125 FORMAT(' X=',D15.6,' Z =',D15.6)
      STOP
      END
      FUNCTION FUNC(XU)
      IMPLICIT REAL*8(A-H,O-Z)
      REAL*8 LMSERR
      DIMENSION PHJ(26,2)
      DIMENSION Z(26),X(26),A(2,2),C(2),ZZ(26)
      DIMENSION TMP(2)
      DIMENSION U(2)
      COMMON CC,D,X,Z,C,U,NN
      CC = U(1)*XU
```

```
D = U(2)*XU
FORMAT(1X,2D20.13)
FORMAT(//)
CONSTRUCT PHJ ON BASES X**2 AND +1.D0
DO 10 I=1,NN
XISQ = (X(I)+CC)**2
PHJ(I,1) = XISQ
ZZ(I) = (Z(I)+D)**2
PHJ(I,2) = 1.D0
CONTINUE

CALCULATE A =(PHJ TRANSPOSE)*PHJ

DO 20 I=1,2
DO 20 J=1,2
A(I,J) = 0.D0
DO 20 K=1,NN
A(I,J) = A(I,J)+PHJ(K,I)*PHJ(K,J)

CALCULATE (PHJ TRANSPOSE)*ZZ

DO 21 J=1,2
TMP(J) = 0.D0

DO 21 I=1,NN
TMP(J) = TMP(J)+PHJ(I,J)*ZZ(I)

CALCULATE A INVERSE

CALL EXPMN2(A,DET)
IF(DET) 23,22,23
WRITE(6,101)
FORMAT(' DET = ZERO')
GO TO 999

CALCULATE THE C'S

CONTINUE
DO 24 I=1,2
C(I) = 0.D0
DO 24 J=1,2
C(I) = C(I)+A(I,J)*TMP(J)
PRINT 102,CC,D,(C(I),I=1,2)
FORMAT(' C =',D15.6,' D =',D15.6,' COEFF''S: ',2D15.6)

RE-EXPAND Z'S R.E. X'S AND C'S.

DO 30 I=1,NN

ZZ(I) = 0.D0
ZZSQ = C(1)*(X(I)+CC)**2+C(2)
IF(ZZSQ) 30,30,31
ZZ(I) = DSQRT(ZZSQ)-D
CONTINUE

COMPARE WITH INPUT DISPLACEMENTS

PRINT 104,(X(I),Z(I),ZZ(I),I=1,NN)
FORMAT(' X=',D15.6,' Z=',D15.6,' ZZ=',D15.6,//)
GENERATE THE L.M.S. ERROR

LMSERR = 0.D0
DO 40 I=1,NN
```

```
      LMSERR =(Z(I) -ZZ(I))**2+LMSERR
      PRINT 511,LMSERR
  511 FORMAT(' L.M.S. ERROR =',D15.6,//)
      CONTINUE
      FUNC = LMSERR
      RETURN
      END
      SUBROUTINE EXPMN2(A,DET)
      IMPLICIT REAL*8(A-H,O-Z)
      DIMENSION A(2,2),C(2,2)
      C(1,1) = A(2,2)
      C(1,2) = A(2,1)
      C(2,1) = A(1,2)
      C(2,2) = A(1,1)
      DET = A(1,1)*A(2,2)-A(1,2)*A(2,1)
      IF(DET) 1,2,1
    1 DET = 1.D0/DET
      DO 10 I=1,2
      DO 10 J=1,2
   10 A(I,J) = C(J,I)*DET*(-1.D0)**(I+J)
      CONTINUE
      RETURN
      END
      SUBROUTINE GSRCH(BOTTOM,TOP,ACC,X,Y)
      IMPLICIT REAL*8(A-H,O-Z)
      PRINT 500
  500 FORMAT(' GSRCH',/////)
C     GOLDEN SECTION SEARCH
C     BOTTOM,TOP DEFINE LIMITS OF INTERVAL IN X TO BE SEARCHED.
C     X IS FINAL VALUE OF ABSCISSA,Y IS FINAL VALUE OF FUNCTION
C     ACC IS THE RELATIVE FRACTIONAL PART OF Y THAT WILL INDICATE
C     CONVERGENCE.
      LM = 20
      D0 = 0.618034D0
      XB = BOTTOM
      XR = (TOP-XB)*D+XB
      XL = (XR-XB)*D+XB
      XT = TOP
      YB = FUNC(XB)
      YL = FUNC(XL)
      YR = FUNC(XR)
      YT = FUNC(XT)
      N = 0
      X = XT
      Y = YT
  600 YMIN = YMIN1(YB,YL,YR,YT)
      IF(YMIN-YT) 601,602,601
  602 TOP = 2.D0*TOP
      BOTTOM = XT
      GO TO 600
  601 YMIN = DABS(YMIN-Y)/Y
      CONTINUE
  110 N = N+1
      WRITE(6,10) N,XB,YB,XL,YL,XR,YR,XT,YT,Y,YMIN
   10 FORMAT(1X,I5,8D15.6,5X,2D15.6)
      IF(N.GT.LM) GO TO 300
      IF(DABS(XT-XB)-1.D-2) 400,110,110
      CONTINUE
      IF(YMIN.LT.ACC) GO TO 200
      IF(YL.GT.YP) GO TO 120
      XT = XR
      YT = YR
      XR = X
```

```
      YR = YL
      XL = XB+(XR-XB)*D
      Y = FUNC(XL)
      YMIN = YMIN1(YB,YL,YR,YT)
      YMIN = DABS(YMIN-YT)/Y
      Y = YL
      X = XL
      GO TO 100
      CONTINUE
      XB = XL
      YB = YL
      XL = XR
      YL = YR
      XR = XT-(XT-XR)*D
      YR = FUNC(XR)
      YMIN = YMIN1(YB,YL,YR,YT)
      YMIN = DABS(YMIN-YB)/Y
      Y = YR
      X = XR
      GO TO 100
      CONTINUE
      FORMAT(' N =',I5,' SEARCH ENDED',' X=',D20.13,' Y=',D20.13)
      RETURN
      CONTINUE
      FORMAT(' NORMAL EXIT, N =',I5,' X =',D20.13,' Y =',D20.13)
      RETURN
      CONTINUE
      FORMAT(' TOP AND BOTTOM EQUAL, ',I5,' X =',D20.13 ,'
     Y =',D20.13)
      RETURN
      END
      FUNCTION YMIN1(A,B,C,D)
      IMPLICIT REAL*8(A-H,O-Z)
      YMINA = B
      IF(A-B) 1,2,2
      YMINA = A
      YMINB = D
      IF(C-D) 3,4,4
      YMINB = C
      YMIN1 = YMINB
      IF(YMINA-YMINB) 5,6,6
      YMIN1 = YMINA
      CONTINUE
      RETURN
      END
```

What is claimed is:

1. In marine seismic exploration wherein a streamer is drawn by a tow vessel, apparatus for determining the orientation of the portion of said streamer adjacent said vessel, said apparatus comprising:
   a. first angle indicator means for providing a first signal representative of the yaw of said streamer relative to a coordinate system of said vessel,
   b. second angle indicator means for providing a second signal representative of the pitch of said streamer relative to said coordinate system,
   c. means for providing a third signal representative of the roll of said tow vessel in an earth relative coordinate system,
   d. means for providing a fourth signal representative of the pitch of said tow vessel in said earth relative coordinate system, and
   e. signal processing means responsive to said first, second, third, and fourth signals to provide signals representative of the yaw of said streamer in said earth relative coordinate system.

2. The apparatus of claim 1 wherein said first and second angle indicator means each comprises a synchro unit.

3. The apparatus of claim 1 wherein said first and second means each comprises a pendulum unit.

4. A method for determining the orientation of the portion of a towed marine seismic streamer in the vicinity of the two vessel, said method comprising the steps of:
   a. measuring the pitch and yaw of said portion relative to a coordinate system of said tow vessel,
   b. measuring the pitch and roll of said tow vessel in an earth relative coordinate system, and c. combining the measurements from steps a) and b) to provide a measurement of the orientation of said portion in said earth relative coordinate system.

5. A method of operating a marine seismic data collection sysetem to provide data representative of the orientation of the seismic streamer comprising the steps of:
   a. providing a first signal representative of the orientation of a portion of said streamer in the vicinity of the tow vessel,
   b. using a magnetic compass gimballed for rotation about the longitudinal axis of said streamer for providing a second signal representative of the orientation of a remote portion of said streamer,
   c. digitizing said first and second signals, and
   d. recording the digitized signals on a reproducible recording medium.

6. The method of claim 5 wherein said method comprises the further step of removing power from said magnetic compass at those times when seismic data is being acquired.

7. A system for providing data representative of the orientation of a towed marine seismic streamer comprising in combination:
   a. means for providing a first signal representative of the orientation of a portion of said streamer in the vicinity of the tow vessel,
   b. a magnetic compass gimballed for rotation about the longitudinal axis of said streamer for providing a second signal representative of the orientation of a remote portion of said streamer,
   c. means for digitizing said first and second signals, and
   d. means for recording the digitized signals on a reproducible recording medium.

* * * * *